(12) United States Patent
Alrasheed et al.

(10) Patent No.: US 11,584,525 B2
(45) Date of Patent: Feb. 21, 2023

(54) DEEP LEARNING-BASED LOCALIZATION OF UAVS WITH RESPECT TO NEARBY PIPES

(71) Applicants: Saudi Arabian Oil Company, Dhahran (SA); KING ABDULLAH UNIVERSITY OF SCIENCE AND TECHNOLOGY, Thuwal (SA)

(72) Inventors: Ali J. Alrasheed, Thuwal (SA); Fadl Abdellatif, Thuwal (SA); Sahejad Patel, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 263 days.

(21) Appl. No.: 17/107,867

(22) Filed: Nov. 30, 2020

(65) Prior Publication Data
US 2022/0169381 A1 Jun. 2, 2022

(51) Int. Cl.
*B64C 39/02* (2006.01)
*G06T 7/00* (2017.01)
(Continued)

(52) U.S. Cl.
CPC ......... *B64C 39/024* (2013.01); *G05D 1/0094* (2013.01); *G05D 1/12* (2013.01);
(Continued)

(58) Field of Classification Search
CPC ............ B64C 39/024; B64C 2201/127; B64C 2201/146; B64C 39/02; G05D 1/0094;
(Continued)

(56) References Cited

U.S. PATENT DOCUMENTS 10,445,928 B2  10/2019  Nehmadi et al.
10,908,263 B1 *  2/2021  Trigui ................... G01B 11/00
(Continued)

FOREIGN PATENT DOCUMENTS

AU  2014203124 B2  12/2019
CA  3033101 A1 *  2/2018  ................ B25J 9/00
GB  2581403 A  8/2020

OTHER PUBLICATIONS

International Search Report and Written Opinion in corresponding PCT Application No. PCT/US2021/061157, dated Mar. 4, 2022; 11 pages.

(Continued)

*Primary Examiner* — Yonel Beaulieu
(74) *Attorney, Agent, or Firm* — Leason Ellis LLP

(57) ABSTRACT

A system and methodology for launching, flying and perching on a cylindrically curved surface in an environment without human intervention. The system and methodology include an environment awareness sensor device suite having a depth camera arranged to capture and output image data and 3D point cloud data of a field of view; an asset targeting unit arranged to set an asset as a destination location for a landing; a trajectory path determiner arranged to calculate a trajectory path to the destination location; a flight controller arranged to launch and fly the autonomous aerial vehicle to the destination location according to the trajectory path; a situational status determiner arranged to, in real-time, predict a location of an object with respect to the autonomous aerial vehicle based on 3D point cloud data for the object, determine the object is the asset based on a confidence score and autonomously land on the asset.

22 Claims, 17 Drawing Sheets

(51) Int. Cl.
   *G05D 1/00* (2006.01)
   *G05D 1/12* (2006.01)
   *G06T 7/73* (2017.01)

(52) U.S. Cl.
   CPC .......... *G06T 7/74* (2017.01); *B64C 2201/127* (2013.01); *B64C 2201/146* (2013.01); *G06T 2207/10028* (2013.01); *G06T 2207/20081* (2013.01); *G06T 2207/20084* (2013.01)

(58) Field of Classification Search
   CPC .... G05D 1/12; G05D 2201/0207; G05D 1/00; G06T 7/74; G06T 2207/10028; G06T 2207/20081; G06T 2207/20084; G06T 7/00; F17D 5/00
   See application file for complete search history.

(56) References Cited

U.S. PATENT DOCUMENTS

| | | | |
|---|---|---|---|
| 11,464,574 B2 * | 10/2022 | Haider | A61B 34/76 |
| 2017/0205826 A1 * | 7/2017 | Smith | B64C 39/024 |
| 2018/0035606 A1 * | 2/2018 | Burdoucci | H04N 5/232935 |
| 2019/0242743 A1 * | 8/2019 | Patel | G05D 1/0272 |
| 2019/0378423 A1 | 12/2019 | Bachrach et al. | |
| 2020/0174129 A1 | 6/2020 | Abdelkader et al. | |
| 2020/0174478 A1 * | 6/2020 | Abdellatif | B60B 19/12 |
| 2020/0357096 A1 * | 11/2020 | Gao | G06T 5/50 |
| 2021/0089022 A1 * | 3/2021 | Shamma | B64D 47/08 |

OTHER PUBLICATIONS

Ramon-Soria P et al; Autonomous landing on pipes using soft gripper for inspection and maintenance in outdoor enviroments; 2019 IEEE/RSJ International Conference on Intelligent Robots and Systems (IROS), Nov. 3, 2019; pp. 5832-5839.

Huang, Baichuan, Jun Zhao, and Jingbin Liu. "A Survey of Simultaneous Localization and Mapping." arXiv preprint arXiv:1909.05214 (2019). 17 pages.

Guerra, Edmundo, Rodrigo Munguia, and Antoni Grau. "UAV visual and laser sensors fusion for detection and positioning in industrial applications." Sensors 18.7 (2018): 2071. 20 pages.

Guerra, Edmundo, et al. "Detection and positioning of pipes and columns with autonomous multicopter drones." Mathematical Problems in Engineering 2018 (2018). 14 pages.

Guerra, Edmundo, et al. "Deep Learning-Based Detection of Pipes in Industrial Environments." Industrial Robotics—New Paradigms. IntechOpen, 2020. 15 pages.

Süss, Sebastian, et al. "AI-Survey for Self-Flying Vehicles: Exploring the Challenges of Deep Learning." (2018). 8 pages.

Kaila, Gaurav. "How to Easily Do Object Detection on Drone Imagery Using Deep Learning." Medium, NanoNets, Jul. 2, 2018, medium.com/nanonets/how-we-flew-a-drone-to-monitor-construction-projects-in-africa-using-deep-learning-b792f5c9c471. 17 pages.

* cited by examiner

DEEP LEARNING-BASED LOCALIZATION OF UAVS WITH RESPECT TO NEARBY PIPES

FIELD OF THE DISCLOSURE

The present disclosure relates generally to the inspection and maintenance of a structure, and specifically to a method, a system and a computer program using a perching unmanned aerial vehicle (UAV) having a releasable and dockable crawler for inspecting and maintaining the structure.

BACKGROUND OF THE DISCLOSURE

The inspection and maintenance of exposed assets, such as, for example, pipes, vessels, storage tanks, equipment and other structures, can be difficult or impractical to perform by humans in some environments. In such circumstances, the use of automated UAV's can provide a workable alternative. Such inspection and maintenance are often best performed using direct contact on the asset, versus hovering at a distance from the asset. A UAV, however, can be difficult to land, perch, or maneuver on the asset. Further, assets having non-flat surface structures, such as, for example, pipes, can be especially challenging to inspect or maintain with a UAV, as these assets have curved surfaces on which the UAV needs to land, perch, or maneuver.

In addition, inspecting hard-to-reach assets in oil and gas facilities is a challenging task. For example, periodic inspection of elevated assets found in refineries, gas plants, offshore platforms, and other plants or facilities is of paramount importance to prevent unexpected failures, leaks, and shutdowns. These assets include high-elevation structures that are difficult to access during inspection jobs. One way to inspect such assets is to erect scaffolding for an inspector to access the asset and perform manual inspection, for example for thickness measurements using an Ultrasonic Testing (UT) sensor. Such scaffolding is not only expensive and introduces a significant cost barrier for frequent inspection, but also poses safety concerns mainly in the form of falling and tripping hazards.

It is in this regard and other problems in the art that the present disclosure is directed. The present disclosure provides a technical solution for an effective perching UAV having a releasable crawler for inspecting or maintaining assets, including assets having non-flat surfaces.

SUMMARY OF THE DISCLOSURE

The disclosure provides an effective and reliable method, system and computer program for an autonomous aerial vehicle, including for launching and flying the autonomous aerial vehicle from a remote starting location to a preselected asset in an environment, and landing or perching the autonomous aerial vehicle on the asset, without any human intervention.

In a non-limiting embodiment of the disclosure, an autonomous aerial vehicle is provided for launching, flying and perching on a cylindrically curved surface in an environment from a remote starting location without human intervention. The autonomous aerial vehicle comprises: an environment awareness sensor device suite having a three-dimensional (3D) depth camera arranged to capture and output image data and three-dimensional (3D point cloud data of a field of view (FOV); an asset targeting unit arranged to set an asset as a destination location for a landing; a trajectory path determiner arranged to calculate a trajectory path to the destination location from a current location of the autonomous aerial vehicle; a flight controller arranged to launch and fly the autonomous aerial vehicle to the destination location according to the trajectory path; a situational status determiner; and a landing unit arranged to interact with a motor driver suite to land the autonomous aerial vehicle on the object. In the autonomous aerial vehicle, the asset can be a pipe, a vessel or a tank selected by the asset targeting unit from one or more stored images corresponding to an environment. The situational status determiner can be arranged to, in real-time: receive real-time image data and three-dimensional (3D) point cloud data of the field of view (FOV) from the environmental awareness sensor device suite; analyze the received real-time image data and three-dimensional (3D) point cloud data; detect all objects in the field of view (FOV); classify each object in the field of view (FOV) as a cylindrical object or a landmark object; determine a confidence score for each object classified as a cylindrical object; predict an object in the field of view (FOV) is said asset based on the confidence score; predict a location of the object with respect to the autonomous aerial vehicle based on three-dimensional (3D) point cloud data for the object in the field of view (FOV); and, interact with the trajectory path determiner such that the autonomous aerial vehicle is guided towards the object.

In the autonomous aerial vehicle, the asset can be selected by the asset targeting unit based on an operator selection, and the asset targeting unit can be arranged to set a landing location on the object to land the autonomous aerial vehicle.

In the autonomous aerial vehicle, the landing location can include a location on a top surface of the object, a bottom surface of the object, a front surface of the object, or a back surface of the object.

In the autonomous aerial vehicle, the situational status determiner can comprise a deep learning neural network trained for the environment using a training dataset comprising an annotated image for each object in the environment, including the asset and any surrounding landmark.

In the autonomous aerial vehicle, the situational status determiner can be arranged to recognize each landmark object and predict the location of the object with respect to the autonomous aerial vehicle based on a position of each landmark object as the autonomous aerial vehicles moves in the environment.

In the autonomous aerial vehicle, the training dataset can comprise augmented images, including images created by a data augmentation technique. The data augmentation technique can comprise object rotation, object translation, or cropping of images.

In the autonomous aerial vehicle, the deep learning neural network can be arranged to: detect each landmark object; determine a position of each landmark object; and adjust the predicted location of the object in relation to the autonomous aerial vehicle based on the determined position of each landmark object.

In the autonomous aerial vehicle, the environment awareness sensor device suite can comprise one or more cameras, in addition to the three-dimensional (3D) depth camera, each arranged to track nearby landmark objects while the autonomous aerial vehicle is landing on the object.

In a non-limiting embodiment of the disclosure, a computer-implemented method is provided for launching, flying and perching an autonomous aerial vehicle on a cylindrically curved surface in an environment without human intervention. The method comprises: setting an asset in an environment as a destination for the autonomous aerial vehicle;

calculating, by a deep learning model, a trajectory path to the destination from a current location of the autonomous aerial vehicle; launching and flying the autonomous aerial vehicle along the trajectory path; capturing in real-time, by a depth camera, an image and a corresponding three-dimensional point cloud of a field of view (FOV); analyzing in real-time, by the deep learning model, the image and corresponding three-dimensional point cloud of the field of view (FOV); detecting in real-time, by the deep learning model, all objects in the field of view (FOV); classifying in real-time, by the deep learning model, each object in the field of view (FOFV) as a cylindrical object or a landmark object; determining in real-time, by the deep learning model, a confidence score for each object classified as a cylindrical object; predicting in real-time, by the deep learning model, an object in the field of view (FOV) is said asset based on the confidence score; predicting a location of the object with respect to the autonomous aerial vehicle based on three-dimensional (3D) point cloud data for the object in the field of view (FOV); and landing the autonomous aerial vehicle on the object, wherein the asset is a pipe, a vessel or a tank selected from one or more stored images corresponding to assets in the environment. The method can comprise verifying, by the deep learning model, the object is said asset.

In the computer-implemented method, the verifying, by the deep learning model, can comprise tracking the object in successive images and corresponding three-dimensional point clouds from the depth camera. The tracking the object between successive images can comprise: receiving sensor data from a LiDAR sensor; and fusing, by the deep learning model, the sensor data from the LiDAR sensor with the three-dimensional point cloud to determine a location of the tracked object.

In the computer-implemented method, predicting the location of the object with respect to the autonomous aerial vehicle can comprise: recognizing, by the deep learning model, each landmark object in the field of view (FOV); determining, by the deep learning model, a position of each landmark object in the field of view (FOV); and determining, by the deep learning model, the location of the object with respect to the autonomous aerial vehicle based on the position of each landmark object in the field of view (FOV).

In the computer-implemented method, the asset can be selected in response to an operator entry or selection.

In the computer-implemented method, setting the asset in the environment as a destination for the autonomous aerial vehicle can include setting a landing location on the asset to land the autonomous aerial vehicle.

In the computer-implemented method, the deep learning model can be trained for said environment using a training dataset comprising an annotated image for each asset in the environment, including the asset and any nearby landmark.

In the computer-implemented method, the deep learning model can be arranged to recognize each landmark object and predict the location of the object with respect to the autonomous aerial vehicle based on a position of each landmark object as the autonomous aerial vehicle moves in the environment.

The computer-implemented method can comprise receiving, by the deep learning model, additional image data from one or more cameras, in addition to the three-dimensional (3D) depth camera, and tracking, by the deep learning model, nearby landmark objects based on the received additional image data while the autonomous aerial vehicle is landing on the object.

In the computer-implemented method, the deep learning model can be trained to detect each landmark object; determine a position of each landmark object; and adjust the predicted location of the object in relation to the autonomous aerial vehicle based on the determined position of each landmark object.

In a non-limiting embodiment of the disclosure, a non-transitory computer readable storage medium is provide containing launching, flying and perching computer program instructions that, when executed on a processor in an autonomous aerial vehicle, cause the processor to perform an operation comprising: setting an asset in an environment as a destination for the autonomous aerial vehicle; calculating, by a deep learning model, a trajectory path to the destination from a current location of the autonomous aerial vehicle; launching and flying the autonomous aerial vehicle along the trajectory path; capturing in real-time, by a depth camera, an image and a corresponding three-dimensional point cloud of a field of view (FOV); analyzing in real-time, by the deep learning model, the image and corresponding three-dimensional point cloud of the field of view (FOV) in real-time; detecting in real-time, by the deep learning model, all object in the field of view (FOV); classifying in real-time, by the deep learning model, each object in the field of view (FOV) as a cylindrical object or a landmark object; determining in real-time, by the deep learning model, a confidence score for each object classified as a cylindrical object; predicting in real-time, by the deep learning model, the object is said asset; predicting in real-time, by the deep learning model, a location of the object with respect to the autonomous aerial vehicle based on three-dimensional (3D) point cloud data for the object in the field of view (FOV); and landing the autonomous aerial vehicle on the object, wherein the asset is a pipe, a vessel or a tank selected from one or more stored images corresponding to assets in the environment Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1A:
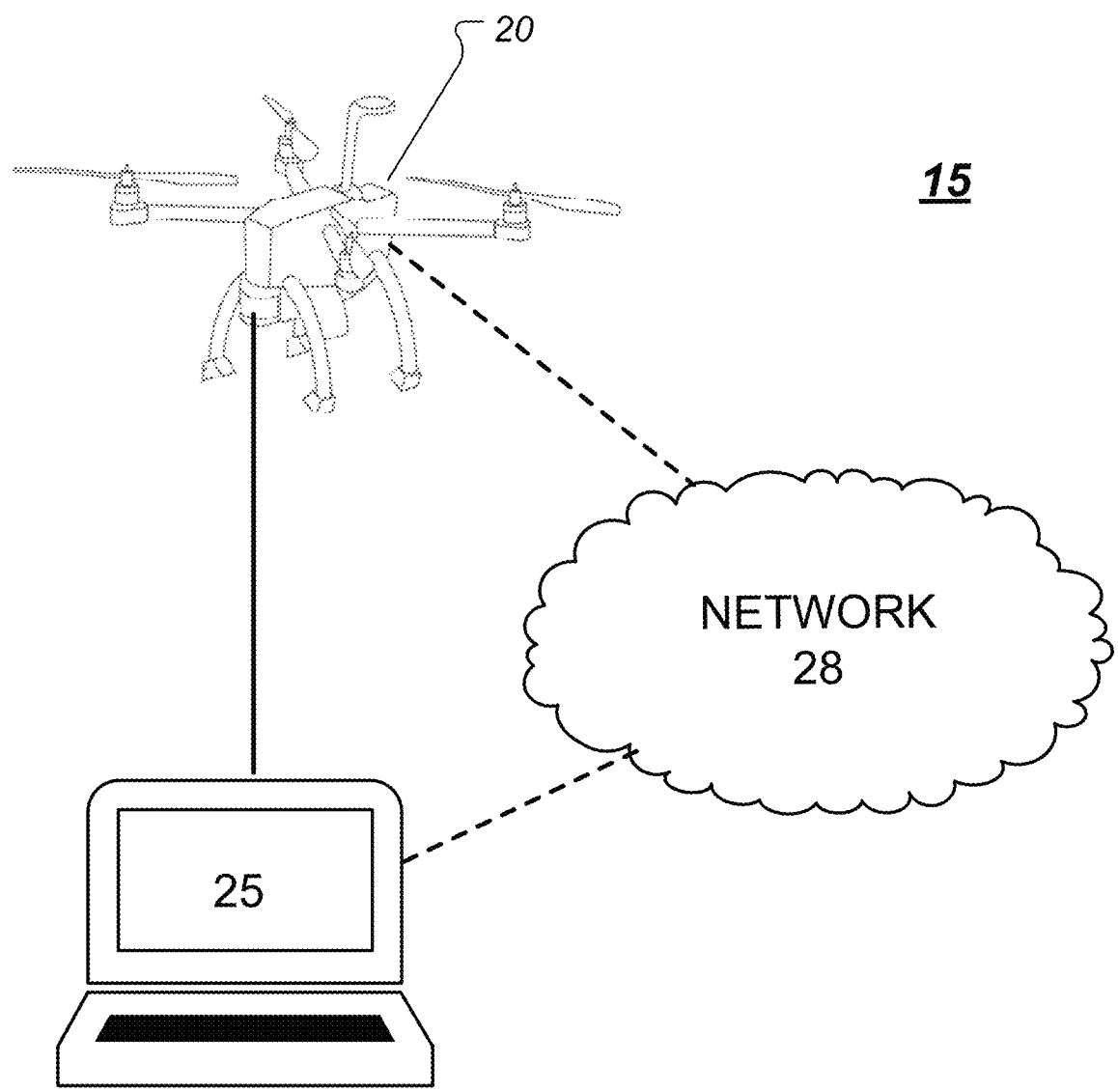
FIG. 1A shows an embodiment of an inspection and maintenance system, including an embodiment of a perching drone (or P-drone).

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

UAVs have become ubiquitous in various applications and in various industries, including structural inspection and maintenance in the oil and gas industry. They have proven to be a flexible, reliable and cost-effective way to inspect assets. The use of UAVs allows industries to improve the quality of inspections and assessments, increase worker safety, reduce the high costs associated with manual inspections, among others. UAVs have been used for a variety of purposes, ranging from aerial viewing of sites containing assets to more complex inspection and assessment of structural integrity. In addition to substantial cost savings, UAVs have resulted in increased worker safety by reducing or eliminating any need to expose humans to hazardous conditions during an inspection process. For instance, UAVs can complete inspections of areas such as, for example, chimneys, smokestacks, storage tanks, critical production units of petroleum refineries, jetties, and hazardous environments without human entry or exposure.

FIG. 1A shows an embodiment of an inspection and maintenance system 15, constructed according to the principles of the disclosure. The system 15 includes a perching unmanned aerial vehicle 20 (PUAV or "P-drone") and a communication device 25. The system 15 can include a network 28. The P-drone 20 and communication device 25 can be arranged to communicate directly over a wired or a wireless communication link, or via the network 28 over one or more communication links. The communication device 25 includes a display device, a user interface and a graphic user interface that can be rendered on the display device and used to build a training dataset and a testing or validation dataset for a machine learning system in the P-drone 20 (discussed below). Once the P-drone's machine learning system is trained, the communication device 25 can be used by an operator to set a target asset for inspection or maintenance, as well as a landing location on the target asset. Alternatively, the target asset and landing location can be selected or set automatically according to, for example, a predetermined inspection or maintenance schedule for a given geographic area, such as, for example, a building, a plant, a facility, or a field.

In an embodiment, the P-drone 20 can be a self-contained fully automated apparatus that includes a display device and user interface. In this embodiment, the capabilities of the communication device 25 can be integrated in the P-drone 20.

Figure 1B:
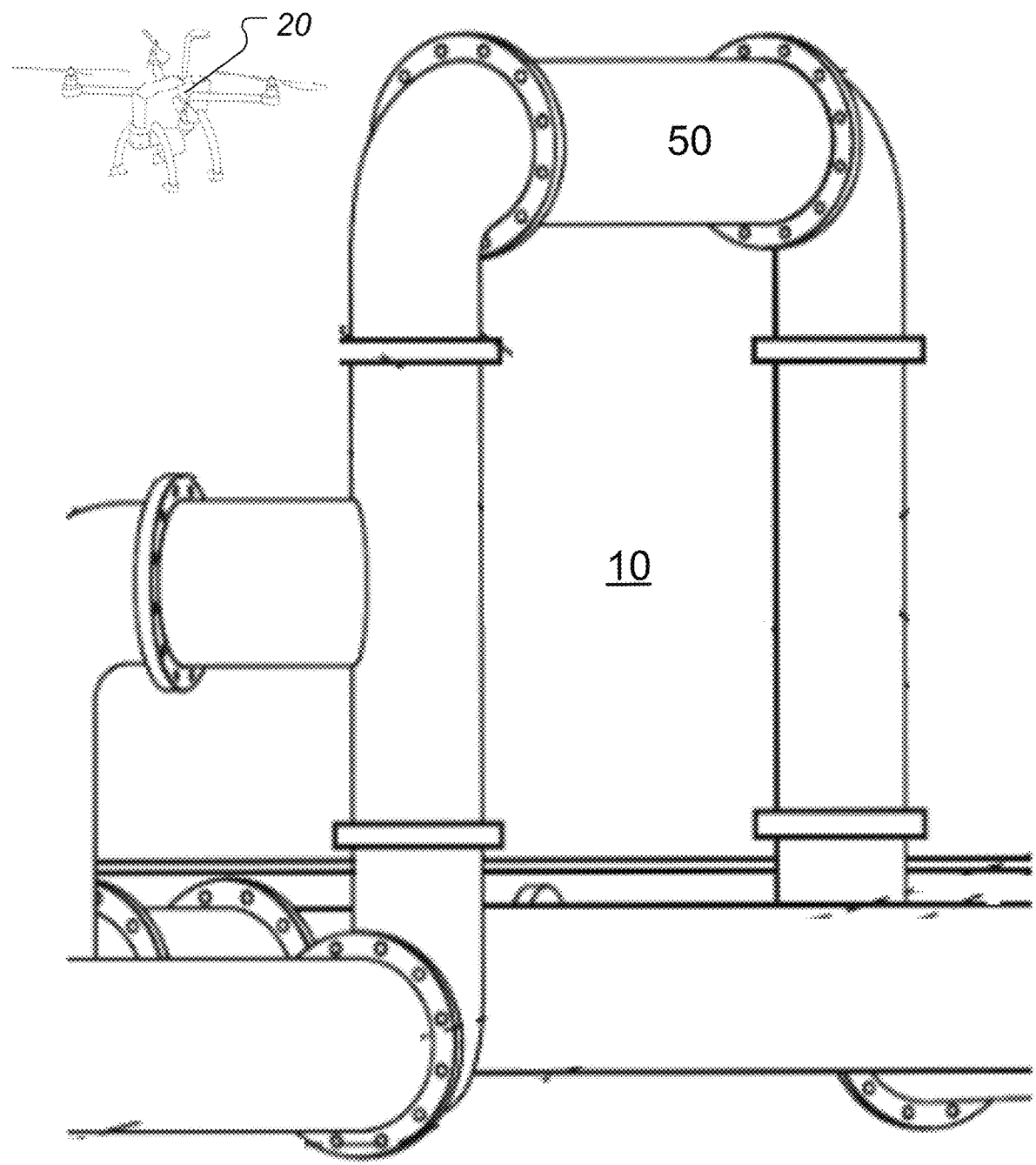
FIG. 1B shows an example of an asset environment that can be inspected or maintained using the P-drone in FIG. 1A.

FIG. 1B depicts an example of an asset environment 10, including a plurality of pipes, that can be inspected or maintained using the P-drone 20. In this example, the environment 10 includes a structure comprising a plurality of pipes connected to each other using flanges, tees and elbows, including a pipe 50. In an embodiment, the P-drone 20 includes a releasable crawler 130 (shown in FIGS. 2-3) that can be released and allowed to traverse the pipes in the environment 10, including the pipe 50, and inspect or maintain one or more sections of each pipe. The P-drone 20 and crawler 130 can each be arranged to carry out inspection of assets located in dangerous environments, hard-to-reach locations, or difficult-to-access locations.

The non-limiting embodiments and examples discussed in this detailed description are primarily with reference to cylindrically shaped assets such as pipes, vessels and tanks, with an understanding that the disclosure can be equally applied with any type of environment or asset, regardless of type, shape, size, material or implementation.

The P-drone 20 is an autonomous PUAV that has advanced capabilities to perform contactless or contact inspections and maintenance of assets. The P-drone 20 can launch, fly and maneuver towards a target asset, attach to or land on (commonly referred to as perching) the asset, and deploy the crawler 130 to traverse an area of the target asset (for example, pipe 50, shown in FIG. 1B) and perform inspection or maintenance, as seen, for example, in FIGS. 2-3. And, once the inspection or maintenance job has been completed and the crawler 130 returned to the P-drone 20, the P-drone can launch and fly back to a home location, or any other preset geographic location.

The entire process of targeting, launching, flying, maneuvering and landing can be done autonomously by the P-drone 20, without any user intervention. Additionally, the process of releasing the crawler 130 on the target asset after perching, performing inspection or maintenance of the target asset by the crawler 130, receiving and docking the crawler 130 in a docking station (not shown) after inspection or maintenance has been completed, and launching and flying home can also be carried out autonomously by the P-drone 20, without any human intervention.

The disclosure provides a system, method and apparatus for autonomous inspection and maintenance of exposed assets such as pipes, vessels or storage tanks that can sometimes be difficult, impractical or dangerous to perform by humans. For instance, in the oil and gas industry, one of the big challenges is to periodically inspect elevated assets found in refineries, gas plants, offshore platforms, or other plants or facilities. These assets can include high elevation pipes and structures that are difficult to access during inspection or maintenance jobs. Sometimes the only way for a human to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards. The autonomous inspection and maintenance system, including the P-drone 20, provides a technological solution to such challenges.

Figure 2:
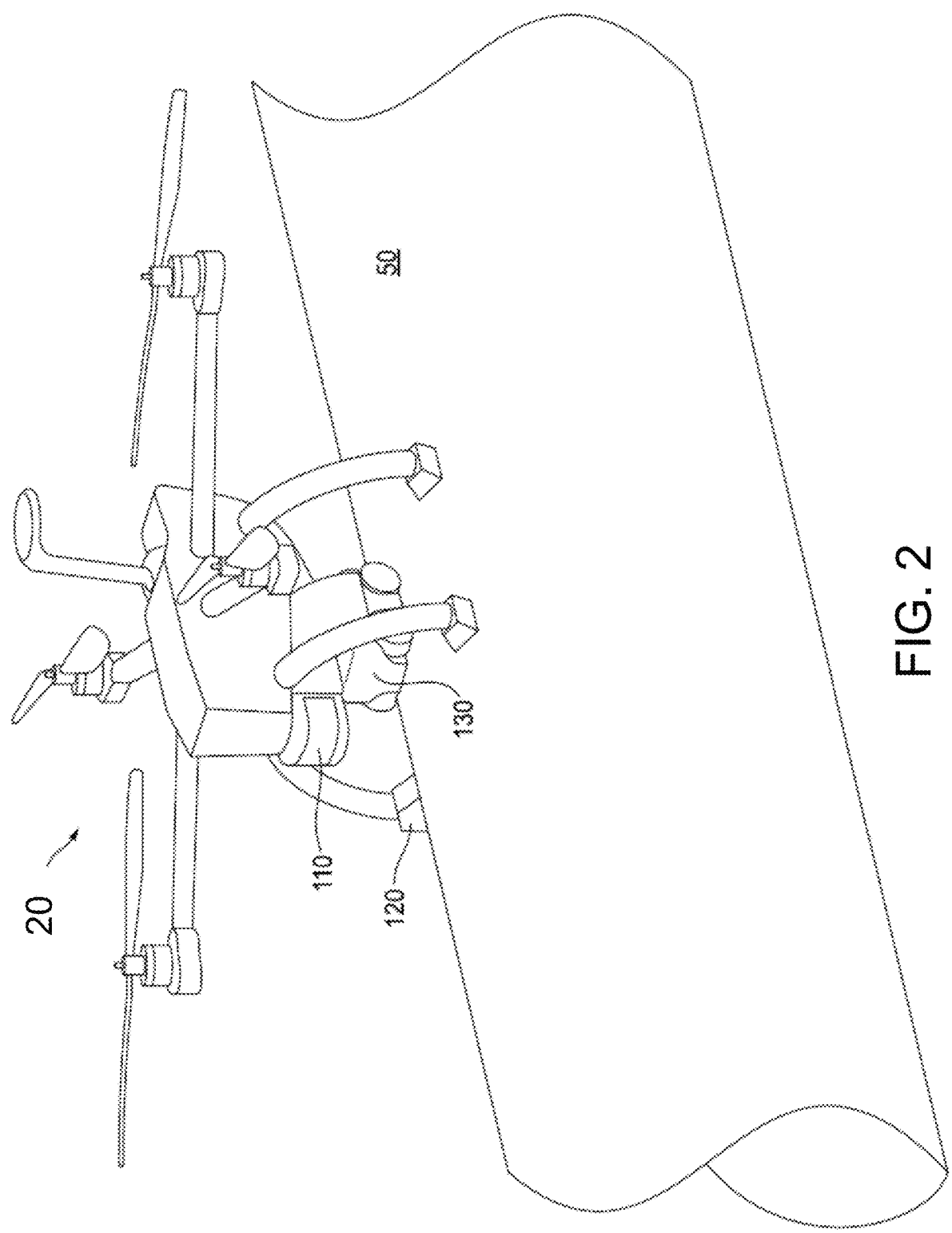
FIG. 2 shows an embodiment of the P-drone perched on an asset in the asset environment in FIG. 1B.
Figure 3:
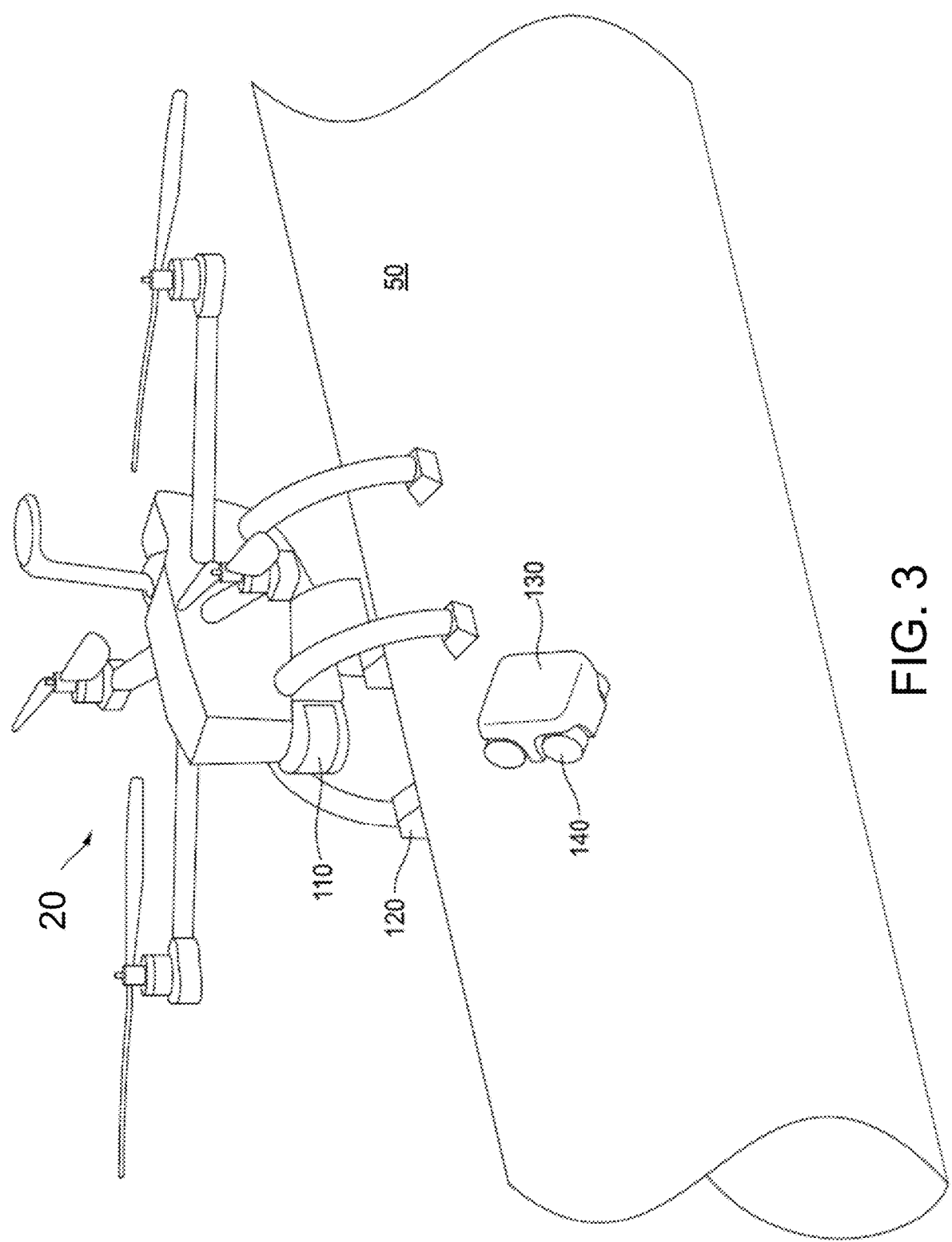
FIG. 3 shows an embodiment of the P-drone perched on the asset with a crawler released to inspect or maintain the asset.

FIGS. 2 and 3 show an embodiment of the P-drone 20 perched on the target pipe 50 in the environment 10 (shown in FIG. 1B). In this example, the P-drone 20 is shown after it has landed and perched on the pipe 50. The P-drone 20, which can include one or more crawlers 130, is arranged to dock and hold the at least one releasable crawler 130. The crawler 130 can be contained in the docking station (not shown) in the P-drone 20, or grasped and held by one or more engagement members (not shown) arranged to catch and hold the crawler 130 by clawing, grasping or otherwise engaging the crawler 130 to secure it to the P-drone 20. The P-drone 20 can include a recharging station (not shown) arranged to charge the crawler 130 when properly seated or docked in the docking station (not shown) or attached to the engagement members (not shown).

The P-drone 20 and crawler 130 are each designed or optimized to perform the capabilities for which it is best suited. The P-drone 20 is arranged to target an asset (or a section of an asset), fly to the target asset, maneuver and land on or attach to the asset, and release the crawler 130 on (or into) the target asset. The crawler 130 is arranged, after the P-drone 20 lands on the asset 50, to traverse a surface of the asset 50 and target an area of the asset for inspection. In the case of multiple crawlers 130, each crawler can be arranged to target a different area of the asset for inspection.

In the example depicted in FIGS. 2-3, the pipe 50 includes a metallic or ferromagnetic material. For such assets, the crawler 130 can be equipped with members 140 to fasten to the asset while traversing or roving on a surface of the asset. The members 140 can include, for example, one or more magnetic or magnetized wheels, tracks (not shown), or legs (not shown), which can allow the crawler 130 to traverse the asset irrespective of the direction of gravity and position itself for optimal inspection of the asset structure, including, for example, performing inspection scans such as thickness measurements using an onboard UT sensor, or other inspections or maintenance processes. The surface or structure of the asset to be inspected can be an external surface area or an internal surface area, such as, for example, an inner wall of a pipe, vessel or storage tank.

The P-drone 20 equipped with the crawler 130 can provide for a more feasible approach than having the P-drone 20 itself traverse the asset, which would require larger and heavier motors and risk collision with nearby assets, especially with limited clearance constraints. The traversing capability provided by the releasable crawler 130 can provide the P-drone 20 important features for inspection and maintenance jobs, including easier accessibility since landing does not have to be on the exact spot where inspection or maintenance takes place. The crawler 130 can be arranged to perform either or both circumferential and longitudinal scans. For instance, in the oil and gas industry, it is important to perform full scans of an asset such as a pipe to find structural aberrations such as, for example, thinning of walls, cracks, holes, corrosion, or other structural damage or characteristics that can lead to asset failure. Such scans often include circumferential scans and longitudinal scans, for which traversing such as crawling is well suited. The traversing action further provides for power efficiency during multiple inspections, since traversing multiple inspection sites on the same asset by one or more crawlers 130 is more power efficient than flying the P-drone 20 to such sites.

In the embodiment depicted in FIGS. 2 and 3, the P-drone 20 has a plurality (for example, four) support members 120 for landing or perching on or attaching to a surface of the asset. Each support member 120 can include a magnet or magnetized component or member to accommodate landing or fastening the support members 120 to the asset. The support members 120 can include, for example, permanent magnets, switchable permanent magnets or electromagnets. To accommodate the landing of the P-drone 20 on the asset, each of the support members 120 (or more precisely, the magnetic field created by its magnetic or magnetized component) can articulate with a perpendicular orientation with respect to the asset when the P-drone 20 has landed or is perching on the asset. It is noted that other orientations are contemplated, as well.

The P-drone 20 includes a plurality of environment awareness sensor (EAS) devices 110, including, for example, a camera, a depth (or RGBD) camera, a laser scanner, a radar scanner, a global positioning system (GPS) receiver, a two-dimension (2D) LiDAR (Light Detection and Ranging) sensor, a three-dimension (3D) LiDAR sensor, a gyroscope, an accelerometer, an inertial measurement unit, or any other sensor device capable of detecting or measuring a condition, material, thing, characteristic or property and transmitting or receiving electromagnetic waves in the electromagnetic spectrum that can be used by the P-drone 20 in calculating and determining the location, position, orientation, range, angle, and velocity of the P-drone 20 in relation to the target asset and landmarks in the surrounding environment, as well as the actual real-time geographic location, position and orientation of the P-done 20. It is understood that the electromagnetic spectrum can have a frequency range of, for example, from about one hertz (Hz) to more than $10^{25}$ (Hz), which includes the sound wave sub-spectrum, radio frequency sub-spectrum, radar sub-spectrum (for example, 5 MHz to 130 GHz) and visible light sup-spectrum. The EAS devices 110 can be located anywhere on or in the P-drone 20 or crawler 130 and arranged to detect, measure or monitor the surrounding environment anywhere along the electromagnetic spectrum using one or more sensors. The EAS devices 110 can be arranged to detect, measure or monitor the environment surrounding the P-drone 20, including a 360° view around the x-, y- and z-planes in the real-world Cartesian coordinate system, so as to provide full 360° awareness in all directions in the environment surrounding the P-drone 20.

The P-drone 20 includes an embodiment of a localization system that is arranged to process and analyze sensor data from the EAS devices 110 to estimate the location, position and orientation (collectively referred to as "localization") of the P-drone 20 with respect to the surrounding environment, including the target asset and surrounding landmarks, which can include the ground and each object in the surrounding environment. In an embodiment, the P-drone 20 includes a localization system 200 (shown in FIG. 5). The localization system can be arranged to determine, in addition to localization of the P-drone 20 with respect to its surrounding environment, the distance or range, angle, and velocity (collectively, with localization, referred to as "situational status") of the P-drone 20 with respect to each landmark in the surrounding environment, including each object in a field of view (FOV) of the P-drone 20. The localization system can be arranged to determine the real-world real-time situational status of the P-drone 20, including the current physical location in terms of latitude, longitude and height, or in terms of Cartesian coordinates x, y, z. The localization system can also estimate the location, opposition and orientation of each object, as well as the velocity of the P-drone 20 with respect to such object. The P-drone 20 can use its situational status, including localization, while flying and maneuvering to avoid collision with objects and to enable autonomous landing on or attachment to the target asset. The P-drone 20 can implement an autonomous inspection or maintenance process based on sensor data from the EAS devices 10, including targeting an asset, launching and flying to the target asset and landing or perching on the target asset, after determining an optimal landing or attachment site on the asset.

In a non-limiting embodiment, the localization system contains a machine learning platform, including, for example, one or more supervised machine learning system or one or more unsupervised machine learning systems. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning.

The P-drone 20 can be arranged to autonomously fly to and perch on hard-to-reach assets in order to perform inspection or maintenance jobs. In some such embodiments, the P-drone 20 can perch on, for example, an elevated target asset and release the crawler 130 to perform an inspection or maintenance job. Unlike manually-operated or hybrid UAVs that are monitored or controlled by an operator who flies the UAV to the vicinity of an asset, which then can perform an autonomous landing maneuver onto the target asset's surface, the P-drone 20 is arranged to be fully autonomous. In some such embodiments, the P-drone 20 can perform the inspection or maintenance itself (for example, without the crawler 130) by maneuvering and hovering in the vicinity of the inspection site, or after landing on at the inspection site. The P-drone 20 can be implemented with or without the crawler 130.

In a non-limiting embodiment, the localization system in the P-drone 20 is arranged to detect and localize cylinder-like assets, such as, for example, pipes, based on color image data and three-dimensional (3D) point cloud data received from one or more RGBD cameras in the EAS devices 110. Localizing cylinder-like structures is a technically challenging task. The P-drone 20 includes a sophisticated system in the localization system that implements the EAS sensor devices to achieve such a task.

As mentioned above, the EAS device 110 can include at least one RGBD camera that outputs both color image data and 3D point cloud data for an area in the camera's field of view (FOV). The RGBD camera can provide color image and a volumetric representation of all objects in its FOV as the P-drone 20 maneuvers in the surrounding environment. The color image and volumetric representation can be provided in two-dimensional (2D), three-dimensional (3D) or four-dimensional (4D) real-world space (or geospace), for example, having x- and y-coordinates, or x-, y- and z-coordinates in the Cartesian coordinate system, including each coordinate as a function of time t—that is, $x(t)$, $y(t)$, $z(t)$—or latitude, longitude, and elevation as a function of time tin the Global Positioning System, or any other real-world 3D coordinate system. The RGBD camera can be arranged to capture still or moving 3D images, including red image (R) data, green image (G) data, blue image (B) data, and depth or volumetric representations (D) data of an entire field of view (FOV) of the RGBD camera, including all objects in the FOV, including a distance measurement and velocity vector to each object and the localization of the P-drone 20 to such object. The depth representations (D) can include a 3D point cloud.

The localization system can be arranged to receive sensor data from the EAS sensor devices, including the color images and volumetric representations from the RGBD camera alone or from a plurality of EAS sensor devices, and identify each object in the surrounding environment as the target asset or a landmark, including all objects in the FOV of the RGBD camera. Analyzing the sensor data in real-time, the localization system can determine the real-world real-time situational status of the P-drone 20 with respect to each object in the FOV. The situational status of the P-drone 20 can include distance data, elevation data, and bearing data with respect to each object, thereby providing the orientation of the P-drone 20 with respect to such object. The orientation data can include, for example, the centroid and orientation of an object in the FOV.

Figure 4:
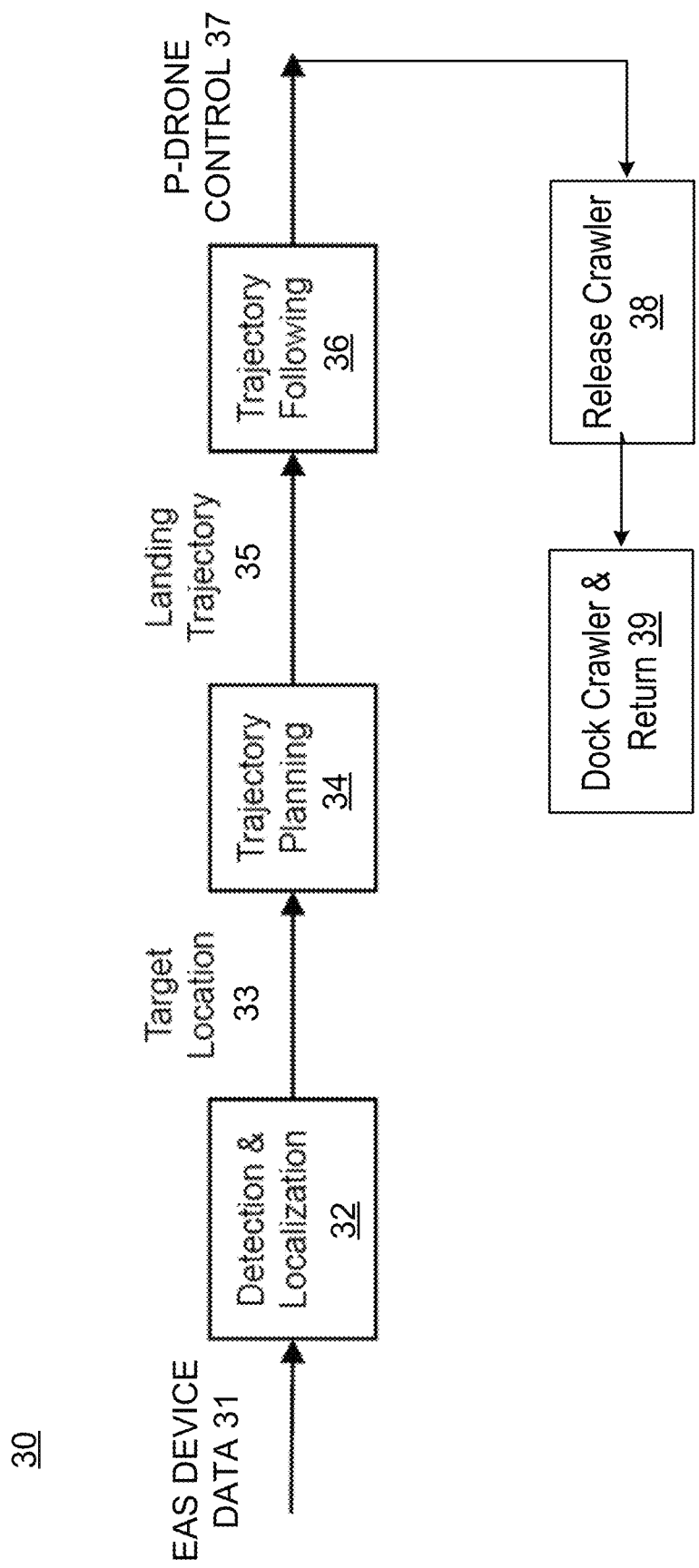
FIG. 4 shows an embodiment of an autonomous guidance and landing process that can be carried out by the P-drone.

FIG. 4 shows a block diagram of an autonomous guidance and landing process 30 that can be carried out by the localization system in the P-drone 20. In this regard, the localization system can be configured, for example, by computer program code, to carry out each step in the process 30.

Initially, the localization system can receive raw sensor data at one or more inputs from various EAS sensor devices 110 (Step 31), including the RGBD camera and one or more scanning sensors such as, for example, the 2D or 3D LiDAR sensors, or an infrared (IR) depth camera. The localization system can process the received sensor data and produce actionable information by which the remainder of the process 30 can be carried out, such as issuing control commands to the P-drone 20 to perform a delicate perching maneuver. In Step 31, the localization system can also receive a target asset selection (for example, the pipe 50, shown in FIGS. 1B and 2-3) to be inspected or maintained using the P-drone 20.

The received EAS sensor data can be processed by the localization system to determine the situational status of the P-drone 20, including localization data (Step 32). The localization system can also receive a target asset selection and identify an asset to be inspected or maintained, as well as the target location (Step 33). Using the real-time location of the P-drone 20 and the location of the target asset as a destination, the localization system can plan out a trajectory path from its real-time current location to the destination (Step 34), including a landing trajectory (Step 35). The trajectory plan can include full landing trajectory data (Step 35) from the current location of the P-drone 20 to the target asset. The localization system can then control the P-drone 20 to follow the trajectory to the target asset (Step 36) and, finally, land or perch the P-drone 20 on the target asset (Step 37). During the trajectory following (Step 36), the localization system can detect objects in the trajectory path and cause the P-drone 20 to maneuver around such objects, returning to the trajectory path after clearing such objects. The localization system can cause the P-drone 20 to follow the planned trajectory, while correcting for any disturbances or deviations in real-time.

Once the P-drone 20 has landed and is properly perched on the target asset, the localization system can cause the crawler 130 (shown in FIGS. 2 and 3) to be released to traverse and inspect or perform maintenance of the asset (Step 38). After the crawler 130 completes its inspection or maintenance and returns to the P-drone 20, the crawler can redock in the P-drone 20 and the P-drone 20 can fly back home (Step 39). In flying back home, the localization system can repeat Steps 31 to 37, but with home being set as the destination and landing site, and the trajectory path calculated from the current location of the P-drone 20 to the home destination.

Figure 5:
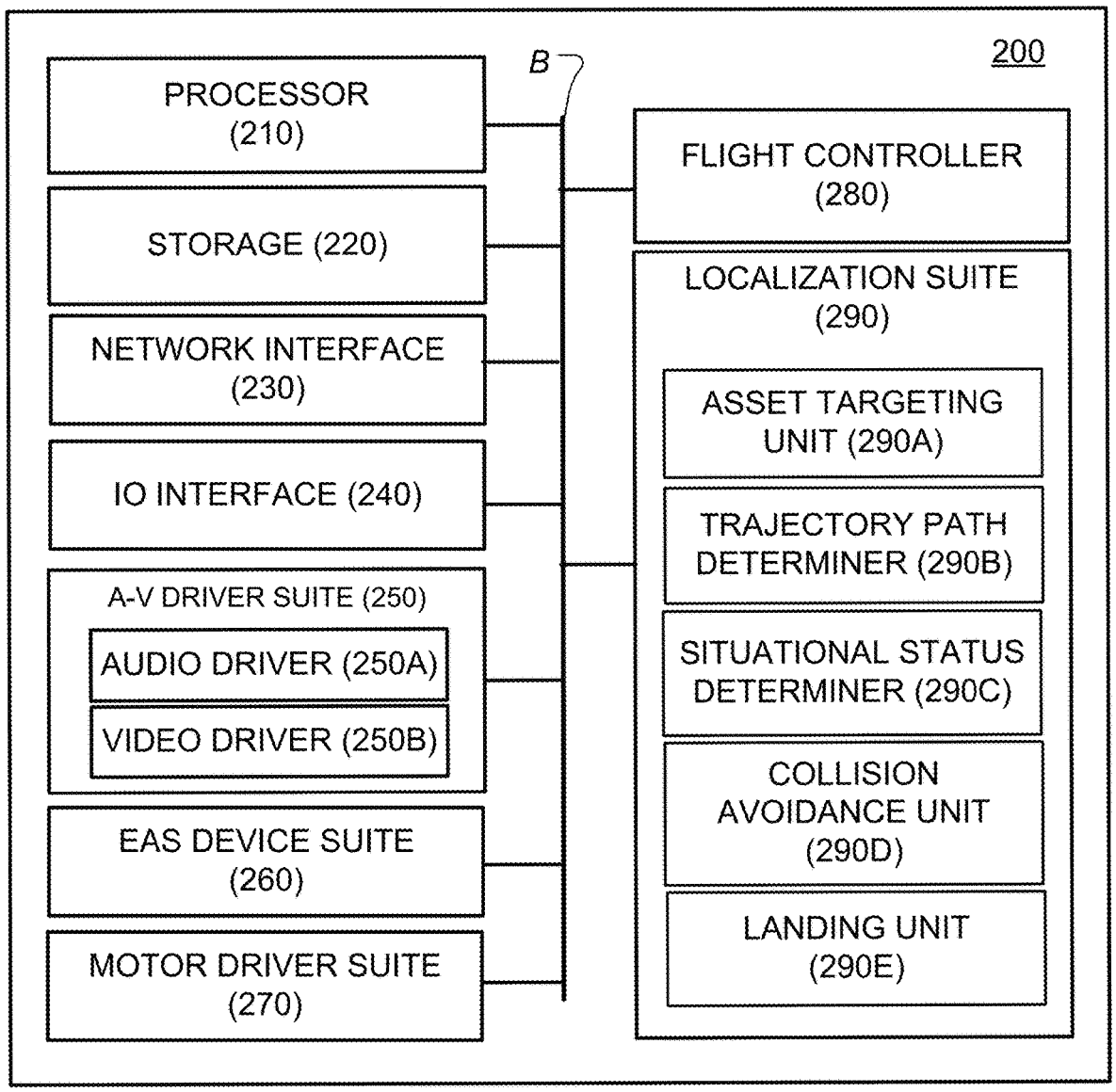
FIG. 5 shows an embodiment of a localization system that can be included in the P-drone.

FIG. 5 shows an embodiment of a localization system 200, constructed according to the principles of the disclosure. The localization 200 can be included in any UAV or PUAV. In an embodiment, the localization system 200 is included in the P-drone 20. The localization system 200 includes a processor 210, a storage 220, a network interface 230, an input-output (IO) interface 240, an audio-video (A-V) driver suite 250, an environment awareness sensor (EAS) device suite 260 containing a plurality of EAS devices (including EAS devices 110, shown in FIGS. 2 and 3), a motor driver suite 270, a flight controller 280 and a localization suite 290. In this embodiment, the localization suite 290 includes an asset targeting unit 290A, a trajectory path determiner 290B, a situational status determiner 290C, a collision avoidance unit 290D and a landing unit 290E, any of which can include a computing resource or a computing device in the localization suite 290. The system 200 can include a bus B, which can be connected to any or all of the components 210 to 290 by a communication link.

Any one or more of the components 210 to 290 can include a computing resource or a computing device. The components 230 to 290 can include a computing resource or computing device that is separate from the processor 210, as seen in FIG. 5, or integrated with the processor 210. Any of the components 230 to 290 can include a computer resource that can be executed on the processor 210 as one or more processes. The computer resources can be contained in the storage 220.

The bus B can include any of several types of bus structures that can further interconnect to a memory bus (with or without a memory controller), a peripheral bus, and a local bus using any of a variety of commercially available bus architectures.

The processor 210 can include any of various commercially available processors, including for example, a central processing unit (CPU), a graphic processing unit (GPU), a general-purpose GPU (GPGPU), a field programmable gate array (FGPA), an application-specific integrated circuit (ASIC), a system-on-a-chip (SOC), a single-board computer (SBC), a manycore processor, multiple microprocessors, or any other computing device architecture. The processor 210 can be arranged to interact with any of the components 220 to 290 to carry out or facilitate the processes included, described or contemplated by this disclosure. The processor 210 can be arranged to run one or more machine or deep learning systems.

The processor 210 can be arranged to run an operating system (OS), which can include an operating system (OS) kernel that can control all operations on the localization system 200. The OS kernel can include, for example, a monolithic kernel or a microkernel. The OS kernel can be arranged to execute on the processor 210 and have control over operations in the processor 210.

The OS or OS kernel can be contained in the storage 220 and executed by the processor 210. The OS or OS kernel can be cached in the storage 220, such as, for example, in a random-access memory (RAM). The OS kernel can represent the highest level of privilege on the OS or the processor 210. The OS can include a driver for each hardware device with which the processor 210 might interact, including, for example, the support members 120 (shown in FIGS. 2 and 3), the drone propeller motors (not shown), the EAS device suite 260, and a crawler capture and release station (not shown). The OS kernel can be arranged to allocate resources or services to, and enable computing resources or processes to share or exchange information, protect the resources or services of each computing resource or process from other computing resources or processes, or enable synchronization amongst the computing resources or processes.

The OS kernel can, when a process is triggered, initiate and carry out the process for that computer resource, including allocating resources for the process, such as, for example, hard disk space, memory space, processing time or space, or other services on one or more hardware devices, including, for example, the support members 120 (shown in FIGS. 2 and 3), the drone propeller motors (not shown), the EAS device suite 260, and the crawler capture and release station (not shown). The OS kernel can carry out the process by allocating memory space and processing resources to the process, loading the corresponding computing resource (or portion of a computing resource) into the allocated memory space, executing instructions of the computing resource on the OS kernel, or interfacing the process to one or more computer resources or processes.

The OS kernel can be arranged to facilitate interactions between the computing resources or processes. The processor 210, which runs the OS, can be arranged to arbitrate access to services and resources by the processes, including, for example, running time on the processor 210. The OS kernel can be arranged to take responsibility for deciding at any time which of one or more processes should be allocated to any of the resources.

Figure 11:
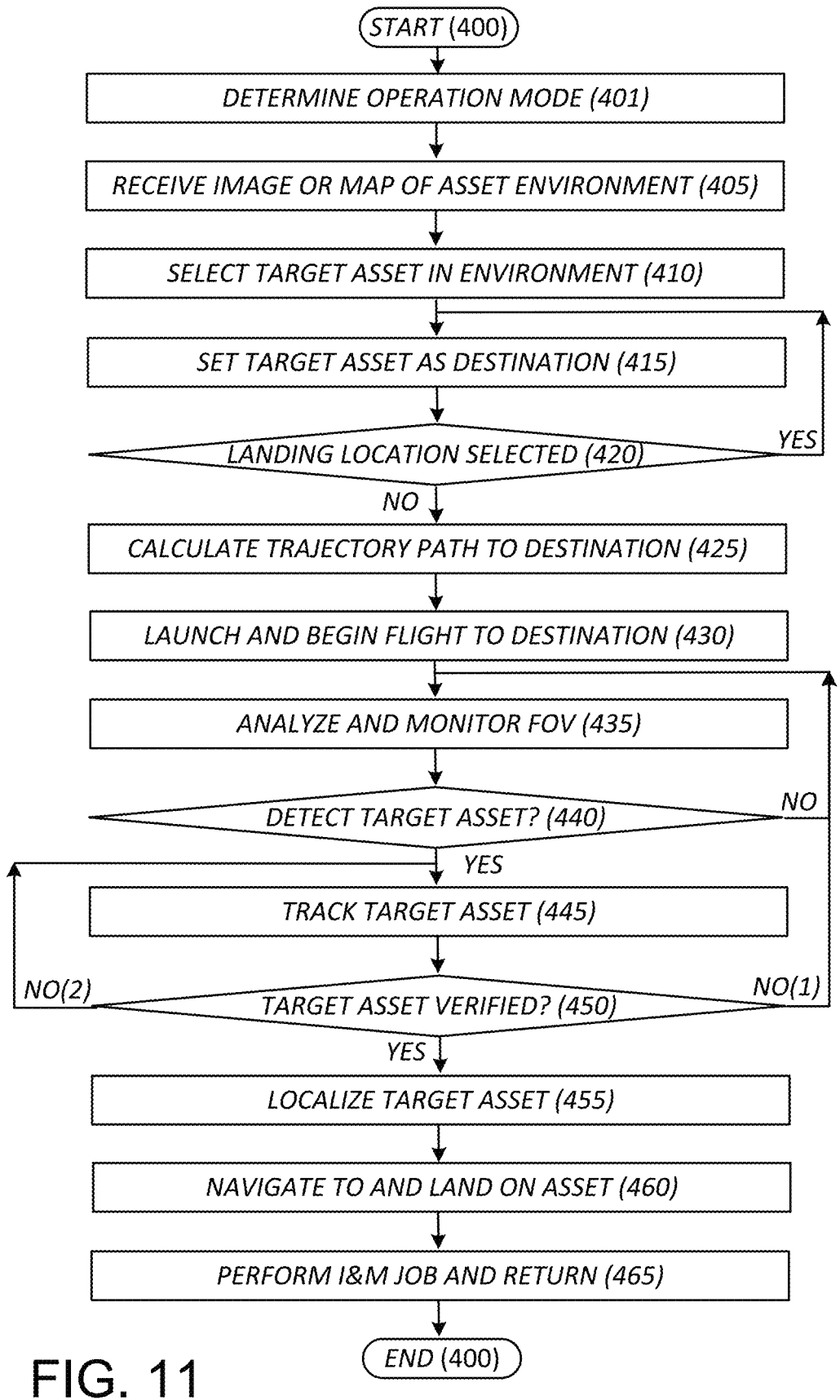
FIG. 11 shows an embodiment of an inspection and maintenance process that can be carried out by the P-drone.

The localization system 200 can include a non-transitory computer-readable storage medium that can hold executable or interpretable computer resources, including computer program code or instructions that, when executed by the processor 210, cause the steps, processes or methods in this disclosure to be carried out, including the process 30 (shown in FIG. 4), the process 300 (shown in FIG. 6), and the process 400 (shown in FIG. 11). The computer-readable storage medium can be contained in the storage 220.

The storage 220 can include a read-only memory (ROM), a random-access memory (RAM), a hard disk drive (HDD), an optical disk drive (ODD), and a database (DB). The storage 220 can provide nonvolatile storage of data, data structures, and computer-executable instructions, and can accommodate the storage of any data in a suitable digital format.

The storage 220 can include the non-transitory computer-readable medium that can hold the computer resources (including code or instructions) that can be executed (run) or interpreted by the operating system on the processor 210. The computer-readable medium can be contained in the HDD.

A basic input-output system (BIOS) can be stored in the non-volatile memory in the storage 220, which can include, for example, a ROM, an erasable programmable read-only memory (EPROM), or an electrically erasable programmable read-only memory (EEPROM). The BIOS can contain the basic routines that help to transfer information between any one or more of the components 210 to 290 in the system 200, such as during start-up.

The RAM can include a dynamic random-access memory (DRAM), a synchronous dynamic random-access memory (SDRAM), a static random-access memory (SRAM), a non-volatile random-access memory (NVRAM), or another high-speed RAM for caching data.

The HDD can include, for example, an enhanced integrated drive electronics (EIDE) drive, a serial advanced technology attachments (SATA) drive, or any suitable hard disk drive for use with big data. The HDD can be configured for external use in a suitable chassis (not shown). The HDD can be arranged to connect to the bus B via a hard disk drive interface (not shown). In a nonlimiting embodiment, the HDD can include the localization suite 290.

The DB can be arranged to be accessed by any one or more of the components in the system 200. The DB can be arranged to receive a query and, in response, retrieve specific data, data records or portions of data records based on the query. A data record can include, for example, a file or a log. The DB can include a database management system (DBMS) that can interact with the components 210 to 290. The DBMS can include, for example, SQL, NoSQL, MySQL, Oracle, Postgres, Access, or Unix. The DB can include a relational database.

The DB can be arranged to contain information about each EAS device suite 260, motor and other hardware device in the P-drone 20 and crawler 130 (shown in FIGS. 2 and 3), as well as each computer resource or process in the P-drone 20 and crawler 130.

Any number of computer resources can be stored in the storage 220, including, for example, a program module, an operating system (not shown), one or more application programs (not shown), or program data (not shown). Any (or all) of the operating system, application programs, program modules, and program data can be cached in the RAM as executable sections of computer code.

The network interface 230 can connect to the network 28 (shown in FIG. 1A). The network interface 230 can be arranged to connect to the crawler 130 (shown in FIGS. 2 and 3) when the crawler 130 includes a network interface arranged to connect to the network 28, as seen, for example, FIG. 1A. The network interface 230 can include a wired or wireless communication network interface (not shown) or a wired or wireless modem (not shown). When used in a local area network (LAN), the network interface 230 can connect to the LAN network through the communication network interface; and, when used in a wide area network (WAN), it can connect to the WAN network through the modem. The modem (not shown) can be connected to the system bus B via, for example, a serial port interface (not shown). The network interface 230 can include a receiver (not shown), transmitter (not shown) or transceiver (not shown).

The input-output (IO) interface 240 can receive instructions or data from an operator via a user interface (not shown), such as, for example, a keyboard (not shown), a mouse (not shown), a pointer (not shown), a stylus (not shown), a microphone (not shown), an interactive voice response (IVR) unit (not shown), a speaker (not shown), or a display device (not shown). The received instructions and data can be forwarded from the IO interface 240 as signals via the bus B to any component in the system 200.

The A-V driver suite 250 can include an audio driver 250A and a video driver 250B. The audio driver 250A can include a sound card, a sound driver (not shown), an interactive voice response (IVR) unit, or any other device necessary to render a sound signal on a sound production device (not shown), such as for example, a speaker (not shown). The video driver 250B can include a video card (not shown), a graphics driver (not shown), a video adaptor (not shown), or any other device necessary to render an image signal on a display device (not shown).

The EAS device suite 260 includes a plurality of environment awareness sensor devices, including the EAS devices 110 (shown in FIGS. 2 and 3). The EAS device suite 260 can include a driver for each EAS device. The EAS device suite 260 includes position and movement sensors that can provide situational status information for the P-drone 20, including its current state in real-time and at any instant in time. The EAS device suite 260 can include sensors arranged to provide six (6), nine (9), ten (10), eleven (11) or any other number degrees of freedom (DOF). For instance, the EAS device suite 260 can include three-axis gyroscopes and accelerometers (commonly referred to as an inertial measurement unit or IMU) for 6 DOF; and, for 9 DOF, a compass can be added to the IMU; and, for 10 DOF, a barometer can be added; and, for 11 DOF, a GPS receiver can be added. The EAS device suite 260 can include, for example, a camera, an infra-red (IR) camera, an RGBD camera, an infra-red RGBD (IR-RGBD) camera, a 2D LiDAR sensor, a 3D LiDAR sensor, a radar transceiver, a GPS receiver, an inertial measurement unit (IMU), an accelerometer, and a gyroscope. The EAS device suite 260 can include exteroceptive sensors arranged to deal with external information such as distance measurements, and non-cooperative sensors arranged to detect targets autonomously for purposes of separation assurance and collision avoidance.

The motor driver suite 270 can include, for each motor (not shown) in the P-drone 20, a driver and a digital electronic speed controller. The motors can include, for example, propellor motors that operate the propellors and actuator motors that operate the support members 120 (shown in FIGS. 2 and 3). The motors can include a motor that drives a catch and a release mechanism (not shown) to releasably secure the crawler 130 (shown in FIGS. 2 and 3) in or to the P-drone 20.

The flight controller 280 includes a computer resource such as, for example, a flight stack, arranged to receive raw sensor data from the EAS device suite 260 and instructions and data from the localization suite 290. The flight controller 280 is arranged to interact with the localization suite 290 and control takeoff, flight, maneuvering and landing of the P-drone, including control of the P-drone motors to ensure UAV stability and collision avoid during operation.

In a non-limiting embodiment, the flight controller 280 is arranged as one or more computer resources arranged to run on the processor 210.

In another non-limiting embodiment, the flight controller 280 includes a computing device such as, for example, a single-board computer (SBC), which can be arranged to run a computer resource such as, for example Raspberry Pi, Beagleboard or any suitable computer program.

The localization suite 290 can include one or more computing resources, each arranged to run on the processor 210, or it can include one or more computing devices, each arranged to interact with the components 210 to 280 in the system 200. The localization suite 290 can include a supervised, unsupervised or both supervised and unsupervised machine learning systems. The machine learning system can include, for example, Word2vec DNN, GAFFE, AIS, ANN, CNN, DCNN, R-CNN, YOLO, Mask-RCNN, DCED, RNN, NTM, DNC, SVM, DLNN, Naive Bayes, decision trees, LMT, NBTree classifier, case-based, linear regression, Q-learning, TD, deep adversarial networks, fuzzy logic, K-nearest neighbor, clustering, random forest, rough set, or any other machine intelligence platform capable of supervised or unsupervised learning. The localization suite 290 can include one or more machine learning (ML) models on the machine learning system.

In the localization suite 290, the asset targeting unit 290A is arranged to select a target asset for inspection or maintenance. The asset targeting unit 290A can be arranged to select a location on the target asset as a landing or attachment location for the P-drone. In a non-limiting embodiment, the target asset is automatically selected based on a predetermined inspection or maintenance schedule, which can be set to occur, for example, daily, weekly, monthly, semiannually, or annually. The schedule can be set such that all assets in a use environment (for example, environment 10, shown in FIG. 1B) are periodically or routinely inspected.

In an embodiment, an operator is provided a user interface window on a graphic user interface (GUI) to allow him/her to choose the target asset for inspection or maintenance, as well as the location on the asset where the P-drone is to land or attach. The GUI can be displayed on the communication device 25 (shown in FIG. 1A) or on the P-drone 20 itself when it includes a display device and user interface. The tag information of the chosen asset can be used by the localization suite to identify the target asset and its location, as well as any landmarks in the surrounding area.

The asset targeting unit 290A can be arranged to interact with the landing unit 290E to determine whether the P-drone 20 should land on top, front, back, bottom or elsewhere on the target asset, or a selected location point on the asset. In this regard, the operate can interact with the user interface window on the GUI to select landing location on the target asset (for example, 12, 3, 6 or 9 o'clock positions, or a specific location point). In this regard, the asset targeting unit 290A or landing unit 290E can interact with the trajectory path determiner 290B to take into consideration the landing position when determining the trajectory path to the target asset. The landing location will affect the trajectory path generation, but need affect the localization itself.

The trajectory path determiner 290B is arranged to determine an optimal trajectory path from the P-drone's current location to the location of the target asset. In this regard, the trajectory path determiner 290B can receive situational status information from the situational status determiner 290C or raw sensor data from the EAS device suite 260, including geographic position data, including, for example, longitude, latitude and height in real-time. Based on the current location and the destination location of the target asset, the trajectory patent determiner 290B can generate a trajectory path that can be communicated to the flight controller 280 to set a flight path for the P-drone 20 from its current location to the target asset location. The trajectory path determiner 290B can be arranged to recalculate the trajectory path in the event the P-drone 20 is maneuvered to avoid collision with an object.

The situational status determiner 290C is arranged to receive sensor data out from EAS sensor devices in the EAS device suite 260, including image data and, for example, 3D point cloud data, 2D LiDAR sensor data, 3D LiDAR sensor data, ultrasound data and radar data. The situational status determiner 290C is arranged to, based on the received sensor data, calculate and determine the current situation status of the P-drone 20 in relation to the target asset and landmarks in the surrounding environment, as well as the real-time real-world location, position, orientation, and velocity (including magnitude and direction vectors) of the P-drone 20. The situational status determiner 290C can output current situational status information to the flight controller 280 or trajectory path determiner 290B in rea-time.

The situational status determiner 290C is arranged to analyze image data from an RGB camera, an RGBD camera and an IR camera, as well as raw sensor data from other EAS devices, such as, for example, radar sensors, 2D LiDAR sensors, 3D LiDAR sensors. Based on the analyzed sensor data, the situational status determiner 290C can detect, analyze, classify and identify each object or structure in its surrounding environment, including any objects in the FOV(s) of the onboard camera(s). The situational status determiner 290C can determine the location of each detected object along with the class of that object. The situational status determiner 290C can generate a confidence score for each object, indicating a level of certainty in the predicted object.

The objects in the FOV can include the target asset and any landmarks in the surrounding environment. In a non-limiting embodiment, the situational status determiner 290C includes a CNN, which can have the representation shown in FIGS. 9 and 10.

In an embodiment, the situation status determiner 290C is arranged, once the machine learning model is trained and verified, to detect all cylindrical objects in the surrounding environment, including, for example, pipes, vessels, and tanks, as well as all landmarks, such as, for example, elbows, flanges, valves, and the ground.

The collision avoidance unit 290D is arranged to interact with the situational status determiner 290C and, based on objects and their locations in the FOV, the collision avoidance unit 290D can determine whether to maneuver around to avoid collision with the object. In this regard, the collision avoidance unit 290D can interact with the flight controller 280 and trajectory path determiner 290B to cause the P-drone to maneuver around an object and, when the object is cleared, return on its trajectory path.

The landing unit 290E is arranged to interact with the other components in the location suite 290 and the flight controller 280 to land the P-drone 20 on the target asset at the location set by the asset targeting unit 290A.

Figure 6:
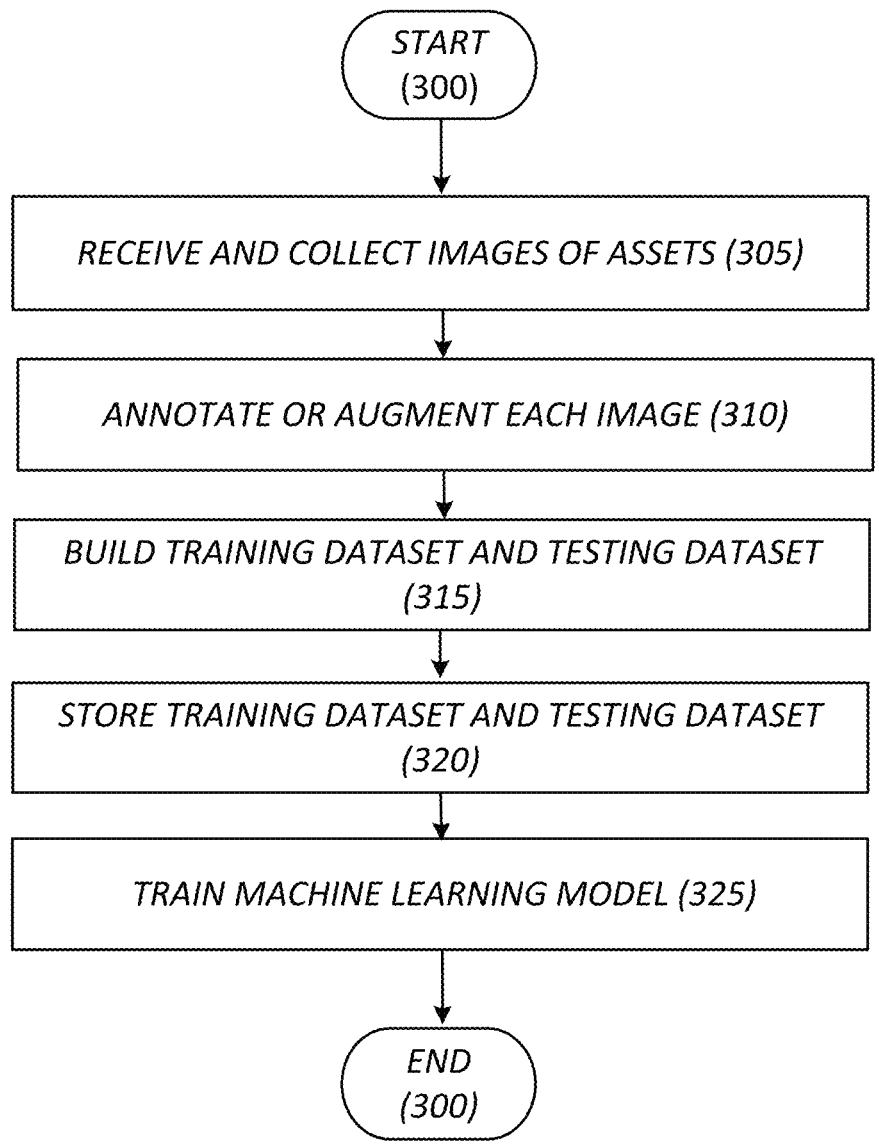
FIG. 6 shows an embodiment of a machine learning model training process that can be used to train a machine learning model in the localization system in FIG. 5.

FIG. 6 shows a block diagram of a non-limiting embodiment of a machine learning model training process 300 that can be carried out to create a training dataset and a testing or verification dataset, and to train the machine learning (ML) model in the localization suite 290. The training and testing datasets can be built on the communication device 25 (shown in FIG. 1A) and supplied to the localization suite 290 to train the ML model. In this regard, the training dataset and the testing or verification dataset can be supplied to the localization suite 290 via, for example, the network interface 230 or the IO interface 240.

Initially, multiple images of each object and structure in a user environment (for example, environment 10, shown in FIG. 1B) can be captured by an RGBD camera (not shown) and a large dataset of color images and corresponding 3D point clouds stored, for example, hundreds, thousands, hundreds of thousands, or more image frames for the entire environment (Step 305). In an embodiment, the color images and 3D point clouds can be supplemented with other corresponding sensor data, such as, for example, IR images or ultraviolet (UV) images of the same FOVs. In an embodiment, the original images and 3D point clouds can be captured by the on-board cameras in the EAS device suite 260 (shown in FIG. 5). In other embodiments, the image and 3D point cloud data can be captured using RGBD cameras that are arranged to reproduce image data of sufficient quality and size as that of the on-board cameras in the EAS device suite 260. The dataset can include color (RGB) images and 3D point clouds of assets such as, for example, pipes, elbows, flanges, valves and other structures, as seen in the example depicted in FIG. 1B. The dataset can include for each object in an image distance data, depth data, or volumetric representation (3D point cloud) data.

Figure 7:
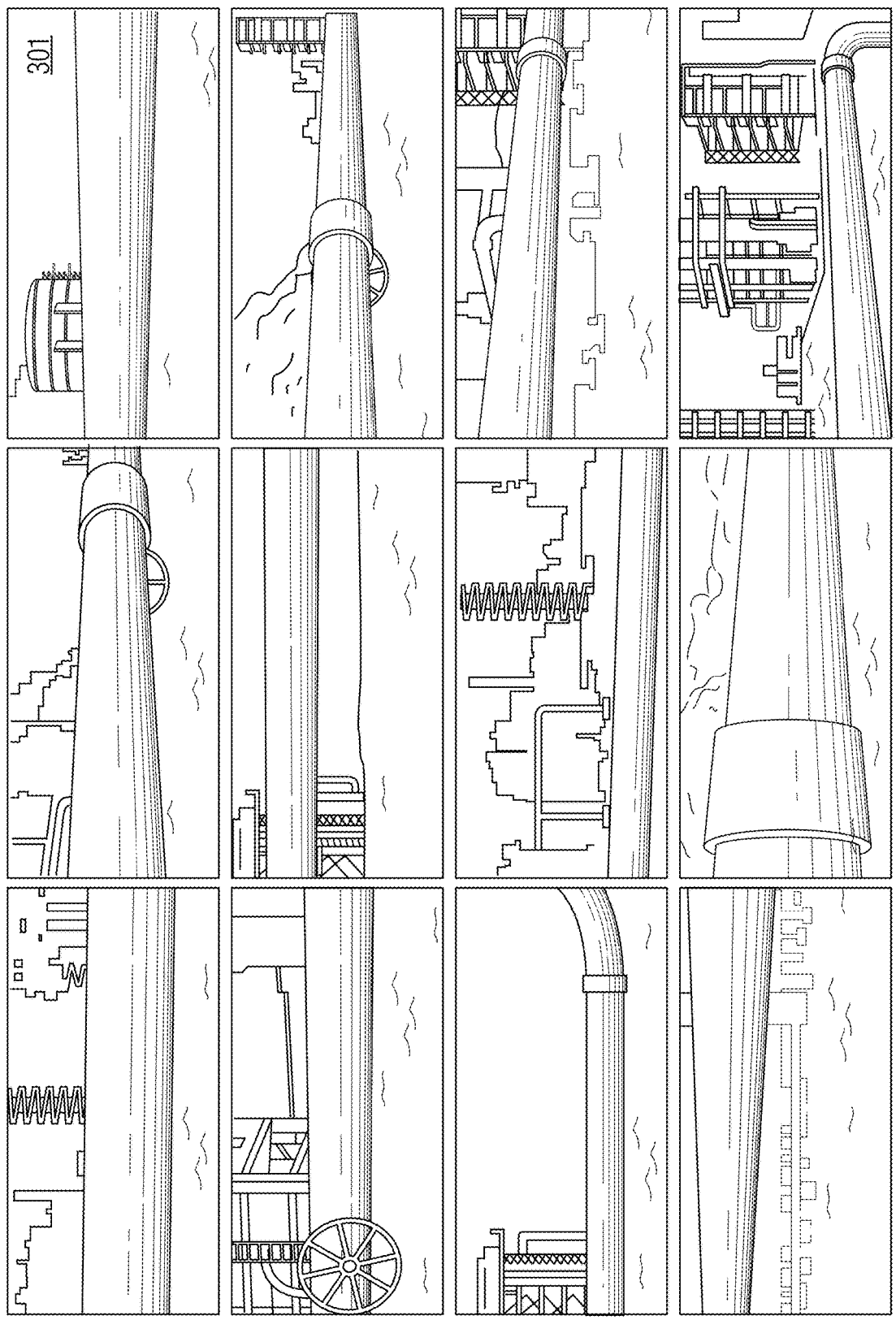
FIG. 7 shows an example of a plurality of images of a pipe and surrounding landmarks that can be included in a training dataset for the machine learning model.

FIG. 7 shows an example of a plurality of images 301 of a pipe and surrounding landmarks taken by the onboard RGBD camera in the EAS device suite 260. In this example, each image frame includes a portion of the pipe from a different angle or perspective. As seen, the images 301 can include a plurality of image frames, each containing an image of a portion of the same pipe and any surrounding landmarks, such as, for example, a flange, an elbow, a valve, a tower, or some other background object or structure. The images 301 can be used to build the training dataset for the deep learning model(s) in the localization system 200. The training dataset can be used to train the model(s) to detect and identify cylindrical objects such as the pipe 50, as well as any landmarks. As seen in FIG. 7, the dataset can include various views of the same pipe from different angles with different backgrounds and different landmarks.

Each color image and 3D point cloud in the dataset can be analyzed and annotated with a tag for each object or structure in the image, including an identifier for each type of asset, which in the example depicted in FIGS. 1B and 2-3 is the pipe 50 (Step 310). The image and point cloud data can be annotated with a tag for each section or characteristic of the asset. Additionally, data augmentations techniques, such as, for example, rotation, translation, cropping, or resizing of assets can be implemented to enrich the dataset. The augmented images can be added in addition to the original dataset, so as to create a more comprehensive training dataset to facilitate detection and identification of assets regardless of the angle of approach or FOV of the particular PUAV.

Figure 8:
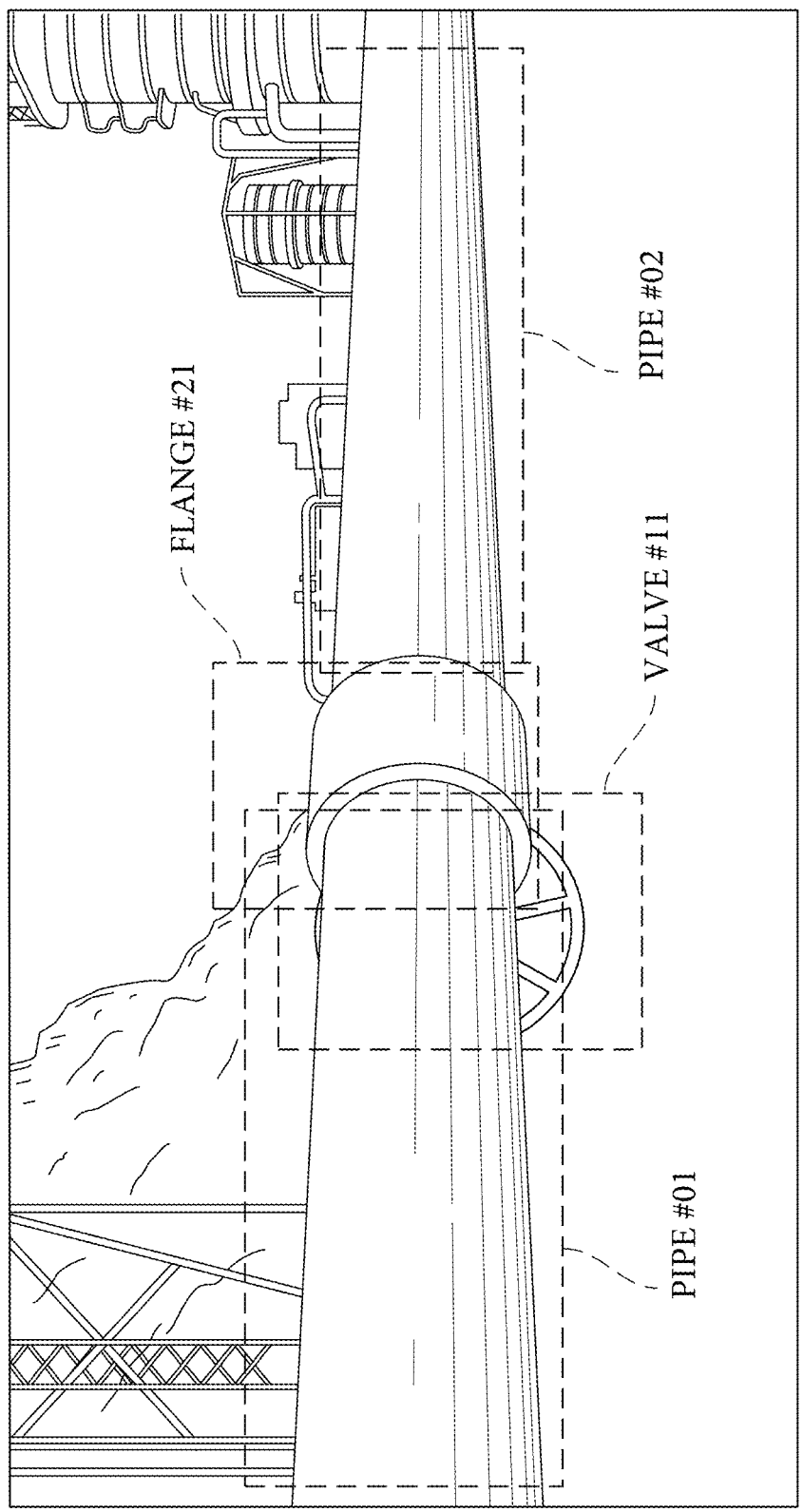
FIG. 8 an example of annotations or tags that can be added to each object in one of the images in FIG. 7 to build the training dataset.

FIG. 8 shows an example of annotations or tags that can be added to the pipe in one of the images 301 (shown in FIG. 7). In this example, the annotations or tags include the labels or descriptors "PIPE #01", "VALVE", "FLANGE" and "PIPE #02", which identify the type of object. The annotations can also include the location of each object in the image frame. All other objects in the image frame can be annotated as landmarks by default. As seen in this example, all the pipes (for example, PIPE #01 and PIPE #02) along with landmarks (for example, VALVE and FLANGE) can be given unique tags or numbers. These tags can be useful in selecting and targeting an asset for inspection or maintenance, and for tracking the targeted asset from one image frame to the next in the FOV of the RGBD camera during flight of the P-drone 20. The tags can be used in identifying the target asset and its location, and instructing the P-drone 20 to fly to the target asset and land at a location on the target asset. The landmarks can be used to provide a reference (map) in the surrounding environment.

After all images in the dataset have been annotated and any augmented images added (Step 310), the dataset can be aggregated to build the training dataset (Step 315). The dataset can also be aggregated to build the testing dataset (Step 315), or another dataset can be provided to build the testing dataset. The training dataset and testing dataset can be stored (Step 320). At the same (or a different time), the training dataset and testing or verification dataset can be supplied to the localization system 200 (shown in FIG. 5) to train the ML model(s) (Step 325).

It is noted that a training dataset can be created for each and every asset located in an environment, or for the environment in its entirety. The environment can include, for example, a facility, a plant, a refinery, a building, or any geographic location containing an asset. Once trained, the ML model(s) can cause the selection and targeting of a particular asset in the environment for inspection or maintenance and commanding the P-drone to fly to, land or perch on the asset, inspect the asset (by itself or via a crawler), and return to the home site, completing the entire process autonomously without any human intervention.

In a non-limiting embodiment, the ML model(s) in the localization suite 290 can be trained, using the training dataset, to detect and identify each cylindrical object and landmark in the user environment (Step 325). As noted earlier, the localization suite 290 can include a CNN, YOLO, Faster R-CNN, or other deep learning neural network suitable for object detection and identification in image data. The annotated images in the training dataset can be used to train the ML model to detect each object in an image frame, classify each detected object as an asset type (for example, cylindrical object) or a landmark, identify the target asset (for example, the pipe 50 shown in FIGS. 1B and 2-3), and determine the 2D position (x, y) or 3D position (x, y, z) of the asset with respect to the image frame. The location of each landmark can also be determined with respect to the image fame. The depth values included in the training dataset can be used by the ML model to transform the 2D position of the asset (pipe) in the image frame to a 3D position within the environment.

Once the ML model(s) in the localization system 200 is trained and validated, it will be part of the localization suite 290 (shown in FIG. 5) in the P-drone 20 (shown in FIGS. 2-3). During a typical flight mission, the P-drone 20 can use the pre-trained ML model to detect all the cylindrical objects (for example, pipes, vessels, tanks) in an assert environment (for example, environment 10, shown in FIG. 1B), as well as landmarks (for example, elbows, flanges, valves) that come within the FOV of the P-drone 20, or, more specifically, the FOV of the onboard camera included in the EAS device suite 260 (shown in FIG. 5). The output of the localization suite 290 can provide the location of each detected object in the FOV along with the class of that object. Ideally a confidence score should be also provided for each object.

Figure 9:
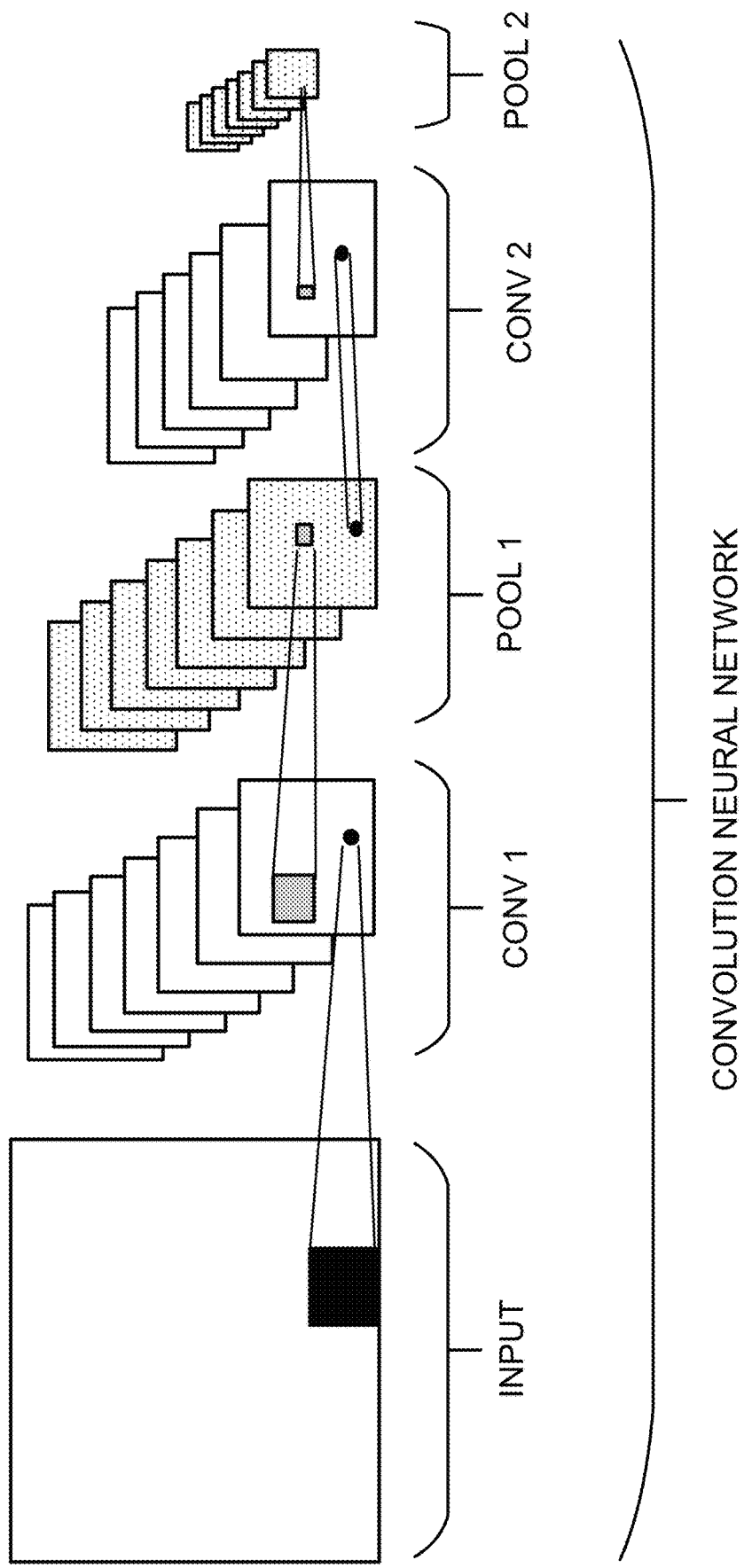
FIG. 9 shows a block diagram of a convolutional neural network that can be included in the localization system.
Figure 10:
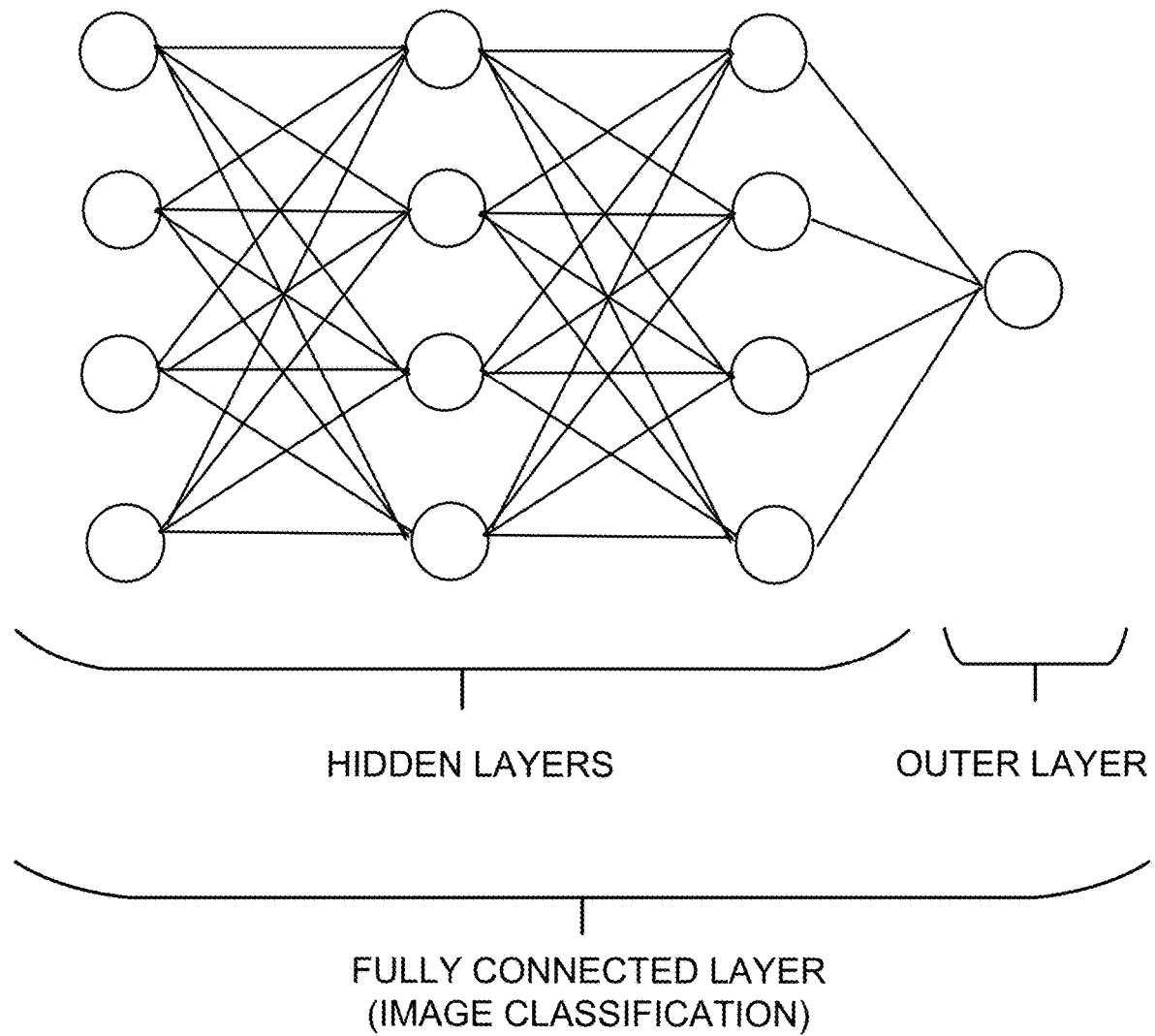
FIG. 10 shows a fully connected layer that can be included in the localization system with the convolutional neural network in FIG. 9.

FIGS. 9 and 10 show an example of a CNN that can be included in the localization suite 290. The CNN can include a plurality of convolutional layers (for example, CONV 1 and CONV 2), a plurality of rectified linear unit layers (ReLU, not shown), a plurality of pooling layers (for example, POOL 1, POOL 2), and a fully connected layer (shown in FIG. 10). Each ReLU layer can be located between a convolution layer and a pooling layer. As seen in FIG. 10, the fully connected layer can include a plurality of hidden layers and an output layer. Data can be flattened before it is transferred from the last pooling layer (for example, POOL 2, shown in FIG. 9) to the first hidden layer (shown in FIG. 10) in the fully connected layer. Although shown with a single output in FIG. 10, it is noted that the fully connected layer can have at least three outputs, including, for example, (i) an object class, (ii) an x-coordinate and (iii) a y-coordinate, or (i) an object class, (ii) an x-coordinate (or bearing), (iii) a y-coordinate (distance) and (iv) a z-coordinate (elevation). In this regard, the ML model can be used to estimate the distance (y), bearing (x), and the elevation (z) of an object in an image of the FOV. The ML model need not be used to predict other degrees of freedom (DOF) such as, for example, roll and pitch, since these are easily obtainable from the onboard IMU in the EAS device suite 260 and so there is no need to rely on visual processing to obtain such situational awareness information.

In an embodiment, the CNN includes an input layer and four convolution layers (instead of the two CONV 1 and CONV 2, shown in FIG. 9) followed by a regression layer. The input layer can supply a greyscale image comprising 26×45 pixels to the first convolution layer having eight filters with a 3×3×1 pixel grid, which can be arranged to filter the image data with batch normalization, ReLU activation and average pooling before supplying the result to the second convolution layer. The second convolution has sixteen filters with a 3×3×8 pixel grid, which are arranged to filter the output from the first convolution layer with batch normalization, ReLU activation and average pooling before supplying the result to the third and fourth convolution layers, each having thirty-two filters and arranged to carry out normalization, ReLU activation and average pooling, except that the third convolution layer uses 3×3×16 pixel grids and the fourth convolution layer uses 3×3×32 pixel grids. The output from the fourth convolution layer can be input to the fully connected or regression layer, which can include at least three (3) outputs—for example, (i) an object class, (ii) an x-coordinate (or bearing), (iii) a y-coordinate (distance) and (iv) a z-coordinate (elevation).

Referring to FIGS. 5, 9 and 10, the localization suite 290 can format received image data into a plurality of pixel matrices such that each pixel matrix has, for example, 26 pixels per row and 45 pixels per column, with three separate channels—that is, one for each color (red "R," green "G," and blue "B"). Additional pixel matrices can be included where received image data includes infra-red (IR) image data, ultraviolet (UV) image data, radar image data, or other spectral band image data. Fewer pixel matrices can be included where the received image data includes monochromatic or bichromatic image data.

The filter matrix (or grid) in the first, second, third and fourth convolution layers can be set to, for example, 3×3×1 pixels, 3×3×8 pixels, 3×3×16 pixels and 3×3×32 pixels, respectively. In each convolution layer, the filter matrix can be successively slid and applied across each pixel matrix to compute dot products and locate features. After applying the four convolution layers to the image data, the resultant data arrays output from the fourth convolution layer can be input to the fully connected or regression layer (shown in FIG. 10). The fully connected layer can auto-encode the feature data and classify the image data to provide at least three outputs, as discussed above.

Using the CNN shown in FIGS. 9 and 10, the localization suite 290 can detect, classify and identify each object and its location in the FOV, including the target asset and surrounding landmarks in the FOV image. In this regard, each FOV image frame can be divided into discrete cells, bounding boxes determined for each cell, and objects predicted in each bounding box. Once the ML model is trained, the sensor data received from the EAS device suite 260 can be analyzed in real-time to detect and identify each object and object type in the FOV, including the target asset and surrounding landmarks, as well as their respective locations.

For instance, during operation of the embodiment of the P-drone 20 containing the localization system 200, the localization suite 290 can associate each pixel in the FOV image data and 3D point cloud data received in real-time from the on-board RGBD camera with a classification label and location, thereby detecting and identifying each object and object type in the FOV, including the target asset or landmarks as they appear in the FOV, as well as the location of each object in the FOV. The localization suite 290 can, for example, using an encoder-decoder based Convolutional/Deconvolutional network for object classification, identify each object and object type in the FOV and recognize the target asset (for example, pipe 50, shown in FIGS. 1B and 2-3) and its surrounding the landmarks (for example, an elbow, a tee, a valve, a coupler) when they appear in the FOV.

In various embodiments of the P-drone 20 and localization system 200, the landmarks can include, for example, a structure, a building, a roadway, a bridge, a railway track, a vehicle, a vessel, an aircraft, a watercraft, equipment, a machine, supplies, materials, a person, an animal, or any other naturally occurring or manufactured article, structure or material that can be located in the FOV of the onboard camera(s).

As noted above, the localization suite 290 can include a Faster R-CNN or Mask-RCNN, which can include an object detection methodology that can mark out each object in the image data, including each distinct object of interest appearing in the FOV. The localization suite 290 can label each pixel with object and location information. The localization unit 290 can include classification noise reduction within each segment to better detect and identify real-world landmarks or land formations.

FIG. 11 shows a block diagram of an embodiment of an inspection and maintenance process 400, according to the principles of the disclosure. The process 400 can be carried out by the localization system 200 (shown in FIG. 5), in which case the localization system 200 can be arranged to carry out any one or more of a plurality of modes. In the embodiment of the process 400, the localization system is arranged to operate in any one or more of seven operation modes, all of which include using at least one camera, including: (1) an RGBD camera mode; (2) an RGBD camera with location sensing mode; (3) an RGBD camera with SLAM mode; (4) a multi-camera mode; (5) an RGBD camera with 2D LiDAR sensor mode; (6) an RGB camera with 3D LiDAR sensor mode; and (7) an RGB camera with 2D LiDAR sensor mode. The RGBD camera (or depth camera or depth color camera) is arranged to output color image data and corresponding 3D point cloud of the camera's field of view (FOV).

Additional modes are contemplated here, depending on the particular EAS device included in the EAS device suite 260.

Referring to FIGS. 5 and 11 concurrently, initially the operation mode of the localization system 200 can be determined or set (Step 401), which can be determined or set based on the particular EAS devices included in the EAS device suite 260 (shown in FIG. 5). An image or a map of an environment, such as, for example, the environment 10 (shown in FIG. 1B) can be received or retrieved from the storage 220 (shown in FIG. 5) or a storage (not shown) located elsewhere, such as, for example, in the communication device 25 (shown in FIG. 1A) (Step 405). An asset or a section of the asset (for example, asset 50, shown in FIGS. 1B and 2-3, or PIPE #01 shown in FIG. 12) in the environment can be selected for inspection or maintenance (Step 410). Once selected, that asset can be set as the target asset (Step 415). The image or map can be received, and the target selected and set, by the asset targeting unit 290A.

Figure 12:
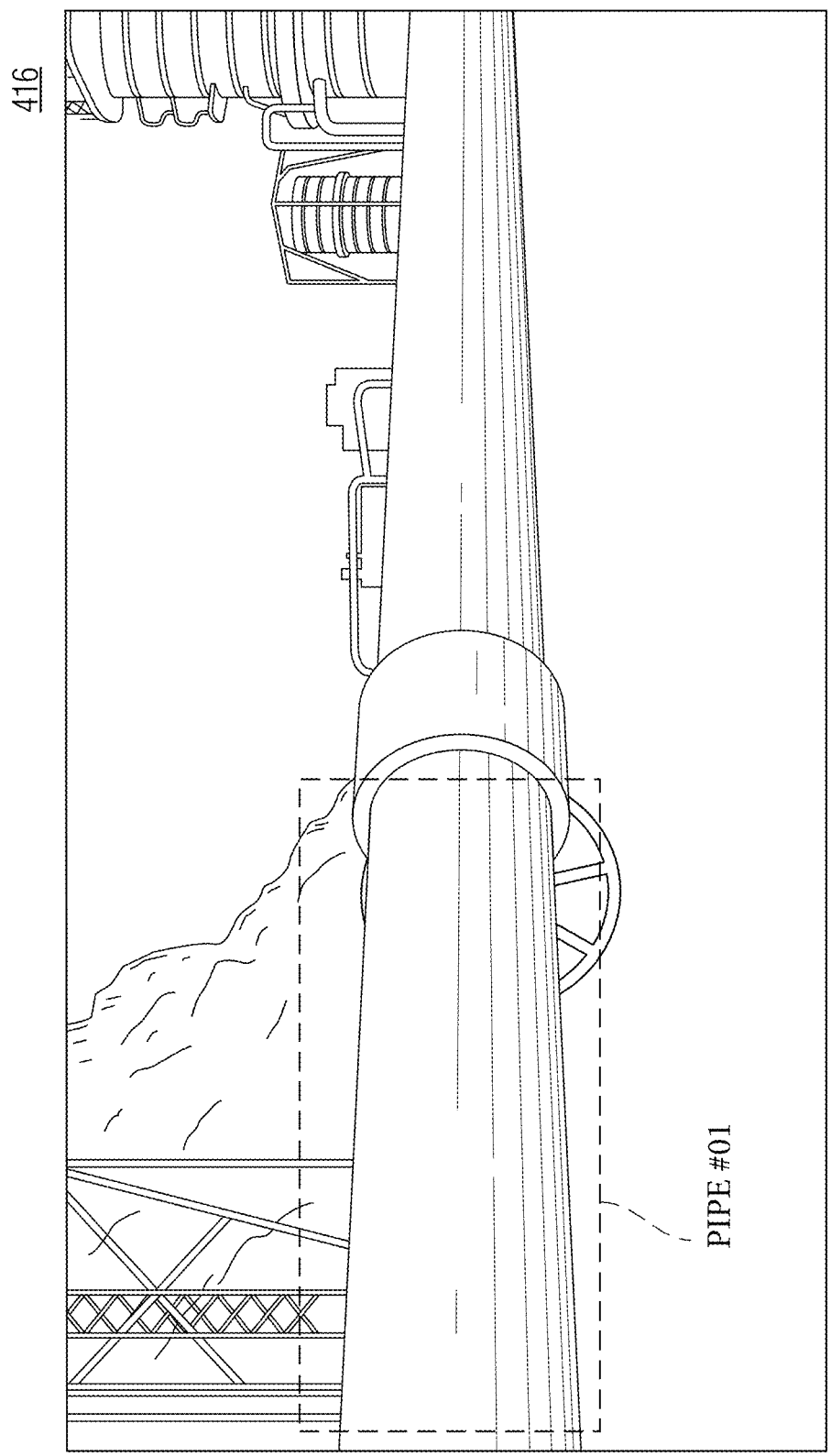
FIG. 12 shows an example of a display screen with an asset selected and set as a target asset.

FIG. 12 shows an example of a display screen 416 with the PIPE #01 selected and set as the target asset.

In an embodiment, the target asset can be automatically selected based on a predetermined maintenance schedule for the particular asset environment. The schedule can include, for example, daily, weekly, monthly, semiannual, annual, or any other periodic (or aperiodic) inspection or maintenance. In this regard, the target asset can be selected according to any suitable inspection or maintenance schedule for the particular asset environment, and it can differ depending on the type of asset (for example, pipe, vessel, tank). The schedule can also depend on the maintenance history of each asset in the environment.

In an embodiment, the image or map of the environment can be displayed on a display device and the asset (or section of the asset) can be selected by an operator using a GUI and a human user interface (for example, mouse and keyboard). The operator selection can be received (Step 410), logged and set as the target asset for inspection or maintenance (Step 415) by the asset targeting unit 290A.

The display device (including GUI) can be included on the P-drone 20 or on the communication device 25 (shown in FIG. 1A), and arranged to allow the operator to view the image or map of the environment and select the target asset. The selection can be received by the asset targeting unit 290A (Shown in FIG. 5) and set as the destination (Step 415).

The target asset can be rendered on the display device and the operator can be allowed to select or set the landing location for the P-drone 20 with respect to the target asset. For instance, the operator can select or set the exact location on the asset by, for example, using a pointer or mouse to mark the location on the asset. The operator can be allowed to select a landing location, such as, for example, on top, front, bottom or back of the asset, in which case the examiner can be presented with a drop down menu on the GUID to select, for example, a 12, 3, 6, or 9 o'clock position on the asset.

In an embodiment, the target asset can be rendered as a photorealistic image (for example, 3D image) that can be manipulated by the operator on the display device, allowing the operator to view the target asset in 3D and select locations on the asset that might not otherwise be visible in 2D, such as, for example, a location on a surface of the asset that is opposite a visible surface of the asset. For instance, the operator can be allowed to manipulate and move the target asset on the display device to expose otherwise non-visible sections, such as, for example, the bottom, top, or back of the target asset.

A determination can be made by the asset targeting unit 290A whether a landing location was set for the target asset (Step 420). If it is determined that a landing location is set (YES at Step 420), then the destination can be updated with the selected landing location (Step 415), otherwise the destination can remain unchanged (NO at Step 420).

If the physical location (for example, x-, y-, z-coordinates, or longitude, latitude, elevation) of the target asset is known, then the destination can be set to that physical location (Step 415) and a trajectory path can be calculated from the current location to that destination (Step 425). The trajectory path can be calculated by, for example, the trajectory path determiner 290B (shown in FIG. 5).

If, however, the physical location of the target asset is unknown, then the destination can be set to a predetermined or arbitrary location in the environment in which the target asset is located (Step 415). The set location can be anywhere in or near the environment. The location can be set to a point from which at least some part of the environment will appear in the FOV and objects recognizable to the localization system 200.

With trajectory path determined (Step 425), the P-drone 20 can launch and begin flying to the destination (Step 430). Once the P-drone 20 is airborne, images of the FOV captured by the onboard camera can be analyzed and monitored (Step 435). The analysis and monitoring can be performed by the situational status determiner 290C, which can process sensor data received from the EAS device suite 260 and identify each object and object type in the FOV, including detecting when the target asset (or a portion of the asset) appears in the FOV and any landmarks. At the same time, the FOV can be monitored for collision avoidance through interaction with the collision avoidance unit 290D, and, should collision with an object be predicted, the flight controller 280 can interact with and cause the motor driver suite 270 to maneuver the P-drone 20 around the object and, after clearing the object, return to the trajectory path.

Figure 13:
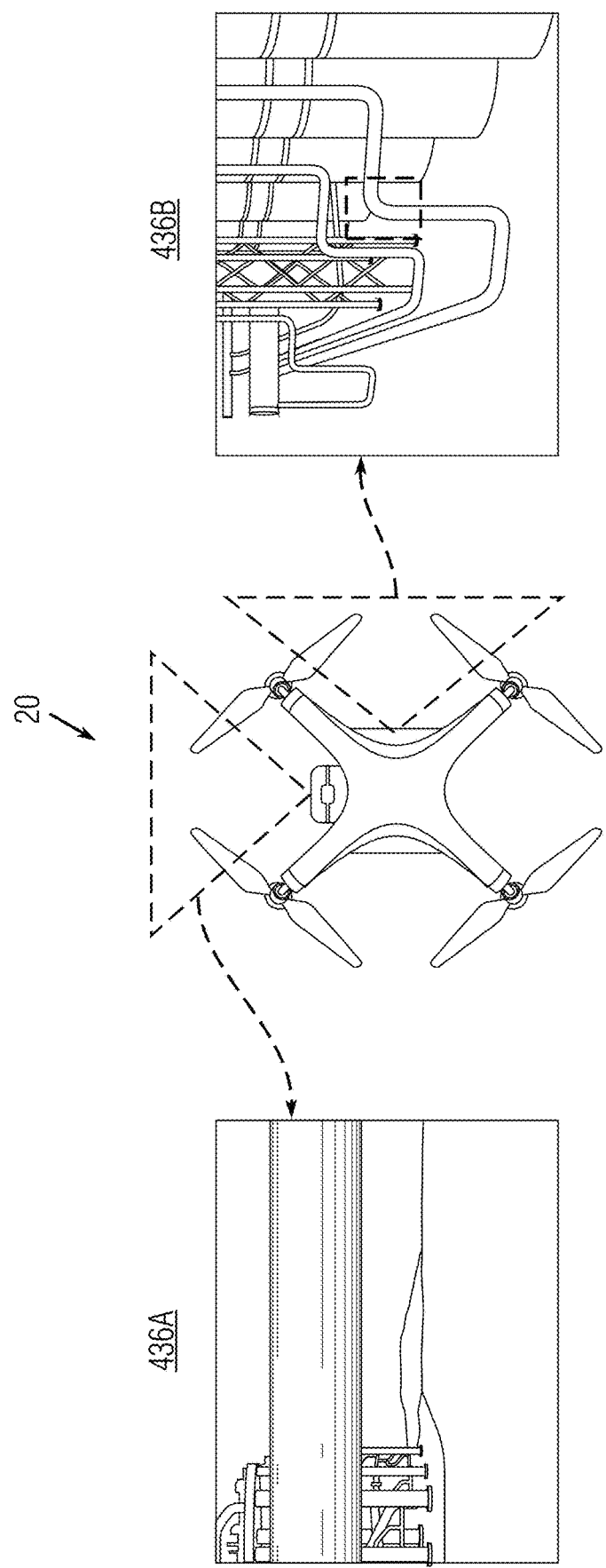
FIG. 13 shows an example of the P-drone having a main front RGBD camera and a side landmark tracking camera.

In an embodiment where the operation mode for the localization suite 200 is set to the multi-camera mode (4), the situational status determiner 290C can be arranged to receive and analyze image data (in Step 435) from multiple cameras in the EAS device suite 260. FIG. 13 shows a non-limiting example of the P-drone 20 having a main front RGBD camera and a side landmark tracking camera, each with a FOV 436A and 436B, respectively. In this example, the FOV 436A of the main camera in includes the target asset in the image frame, and the FOV 436B for the landmark tracking camera includes an image of the surrounding landmarks. The image data from the multiple cameras can be analyzed by the situational status determiner 290C to detect and identify all important landmarks, such as, for examples, landmarks that can be useful in determining the location of the P-drone 20 with respect to the target asset.

In this embodiment, one of the main purposes of the main front camera, which can include the RGBD camera, can be to detect, localize, and track objects and object types in the FOV 436A, including the target asset when it appears in the FOV. Contemporaneously, the landmark tracking camera can be located on the P-drone 20 such that important landmarks can be detected and recognized in the landmark tracking camera FOV 436B to avoid losing important landmarks in the surrounding environment outside the main camera FOV 436A, especially when getting closer and closer to the target asset. In this embodiment, the landmarks can be crucial for accurate localization of the target asset, or for landing the P-drone 20 at a specific point on the asset.

The main front camera can include an RGBD camera that can output color image data and 3D point cloud data to the situational status determiner 290C, which can then analyze the received color image data and 3D point cloud data to detect and localize cylinder-like objects such as pipes that appear in the camera's FOV. As mentioned earlier, 3D point cloud data includes a volumetric representation of the FOV, including distance measurements of sensed objects in the FOV. The situational status determiner 290C is arranged to perform, among other things, segmentation and clustering of each object that appears in the FOV, including a 3D object such as a cylinder.

In an embodiment, the landmark tracking camera includes another RGBD camera, in addition to the main front RGBD camera. The additional RGBD camera can be arranged to find and track the landmarks in the FOV 436B. In this way, landmarks can be available to provide a reference (map) to the situational status determiner 290C. The landmark tracking camera should be positioned in such a way that it has a wider or larger FOV than the main camera. For example, the landmark tracking camera can have a panoramic lens, or have a pan-tilt mechanism for active tracking and, thus, it will be able to rotate up, down, left or right so that it keeps the landmark in its FOV 436B while the P-drone 20 is moving. Either or both the main camera and the landmark tracking camera can be of the depth determining variety, such as, for example, a depth camera, stereo-camera, or a regular camera fused with location awareness, such as, for example, IMU or SLAM from motion, or a LiDAR sensor.

In an embodiment, the P-drone 20 can include the main front camera, a landmark tracking camera on each side of the P-drone 20 and, optionally, a main camera or a landmark track camera on the back.

In an embodiment where the operation mode for the localization suite 200 is set to the RGBD camera with 2D LiDAR sensor mode (operation mode 5), the situational status determiner 290C can be arranged to receive and analyze image data and 3D point cloud data (in Step 435) from the RGBD camera and fuse it with location data from the 2D LiDAR sensor system to accurately determine the location of the P-drone 20 and the location of each object in the FOV, including the location of the P-drone 20 with respect to the target asset and surrounding environment. The addition of the 2D LiDAR sensor can correct for any shortcomings that might otherwise occur by using the RGBD camera alone. Since the RGBD camera provides an accurate location of an object in two directions (x and y in the picture coordinate frame), but can, potentially, fluctuate in the depth value due to the intrinsic way it is measured, the addition of the 2D LiDAR can provide additional position data that can be used by the situational status determiner 290C to adjust and more accurately determine the actual location of each object and the P-drone 20, including the target asset and surrounding landmarks. In RGBD cameras, the depth values are not as stable nor as accurate as those obtained from a LiDAR sensor. Therefore, this embodiment combines the usage of a simple 2D-LiDAR sensor and fusing its depth data with that of the depth camera for more accurate measurement. Since the 2D LiDAR sensor can be used as the primary source for the depth (z-axis), interpolation methods can be used in the situational status determiner 290C to construct the rest of the slices, thereby increasing the accuracy of the point cloud data, and therefore, improving the overall estimation of the location of the target asset.

Figure 15:
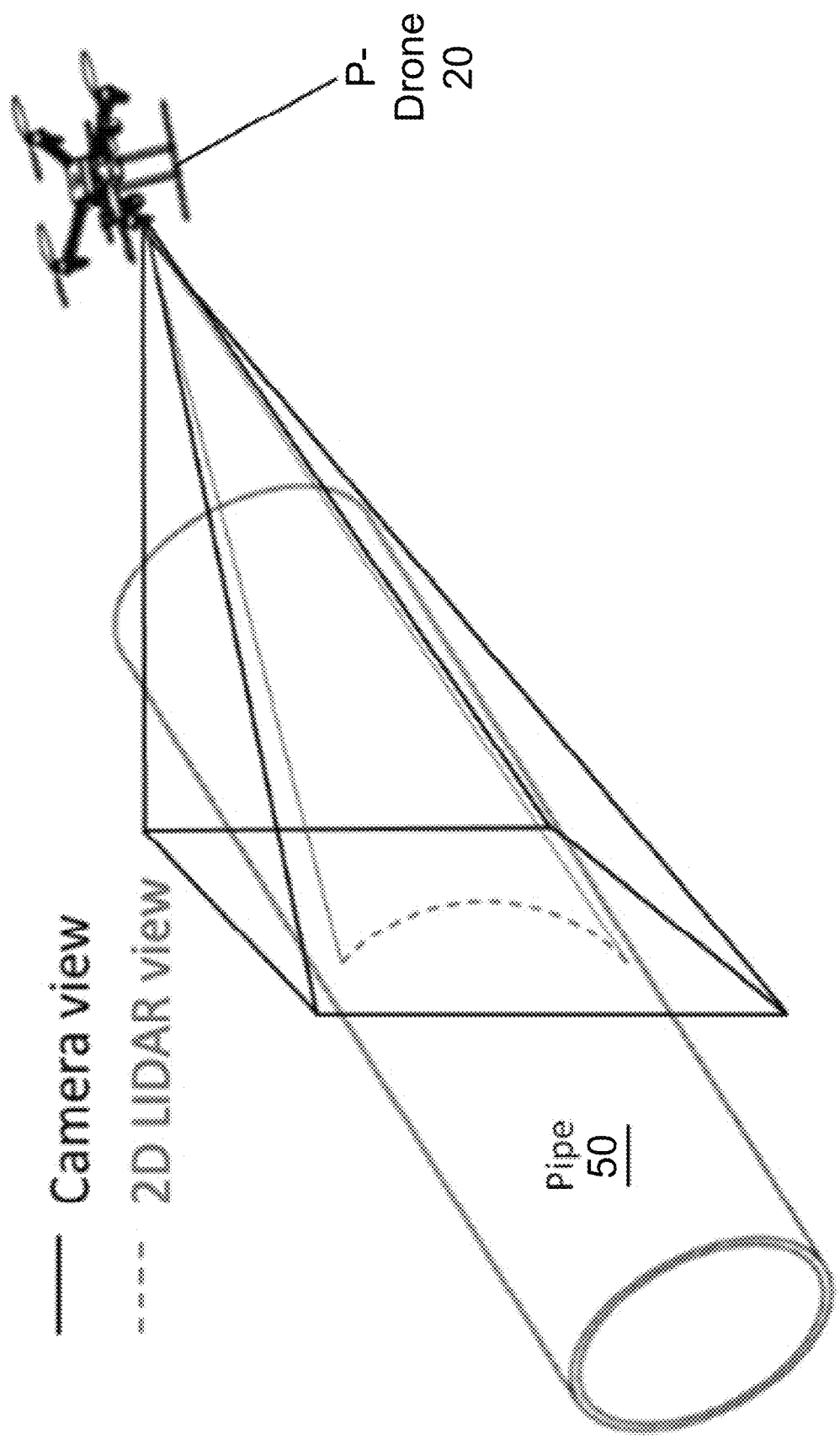
FIG. 15 shows an example of the P-drone detecting a location, position and orientation of a target asset by fusing image data from an RGBD camera with sensor data from a 2D LiDAR sensor.

FIG. 15 shows an example of the P-drone 20 detecting the pipe 50 according to the operation mode (5).

In an embodiment, the situation status determiner 290C can be arranged to rely on the depth camera to provide an estimate of the pipe's location and orientation, and then use the 2D LiDAR sensor to find the actual distance between the P-drone 20 and the pipe 50, and use that to compensate for any error in the location estimated by the depth camera.

In an embodiment where the operation mode for the localization suite 200 is set to the color camera with 3D LiDAR sensor mode (operation mode 6), the situational status determiner 290C can be arranged to receive and analyze color image data (in Step 435) from an RGB camera (without depth data) and sensor data from a 3D LiDAR sensor. Depth cameras are not the only types of devices that can provide point cloud data, nor are they always the most accurate. For this reason, a 3D-LiDAR sensor can be included in this embodiment along with a color (or RGB) camera (regular camera). The situational status determiner 290C is arranged to receive and analyze the image data output from the RGB camera while receiving and analyzing the 3D point cloud data output from the 3D LiDAR sensor. An advantage of using a depth camera (for example, operation mode 1) rather than the combination of the RGB camera and 3D LiDAR sensor (for example, operation mode 6) is that a single device can be used to provide both the point cloud data and colored image, thereby resulting in lower energy usage, lower weight and complexity and lower cost in manufacturing and operation of the P-drone 20. However, the 3D LiDAR sensor can provide a 3D point cloud with much higher accuracy and resolution than a depth camera alone, an advantage that can more than justify the additional costs, complexity and weight.

In an embodiment where the operation mode for the localization suite 200 is set to the color camera with 2D LiDAR sensor mode (operation mode 7), the situational status determiner 290C can be arranged to receive and analyze image data (in Step 435) output from the color camera and distance data output from the 2D LiDAR sensor. Color image data from a normal RGB camera can be analyzed by the situational status determiner 290C to figure out the apparent size of an object in the FOV. The closer P-drone 20 gets to the object, the bigger the object will appear in the FOV. If the real size of the object is known (in this example, the radius of the pipe 50), then it is possible to estimate how far it is from its apparent size in the FOV. The size of the object can be determined automatically or entered by an operator, as discussed below. Not only can the situational status determiner 290C estimate the distance from the P-drone 20 to the pipe (y) using this method, but it can also estimate the elevation of the camera (z) and determine how far above or below it is with respect to the pipe. Moreover, the situational status determiner can estimate the camera angle and find whether it is pointing forward towards the pipe or if it is tilted right or left. Once the camera angle is estimated, the situation status determiner 290C can estimate the bearing (x).

Figure 16:
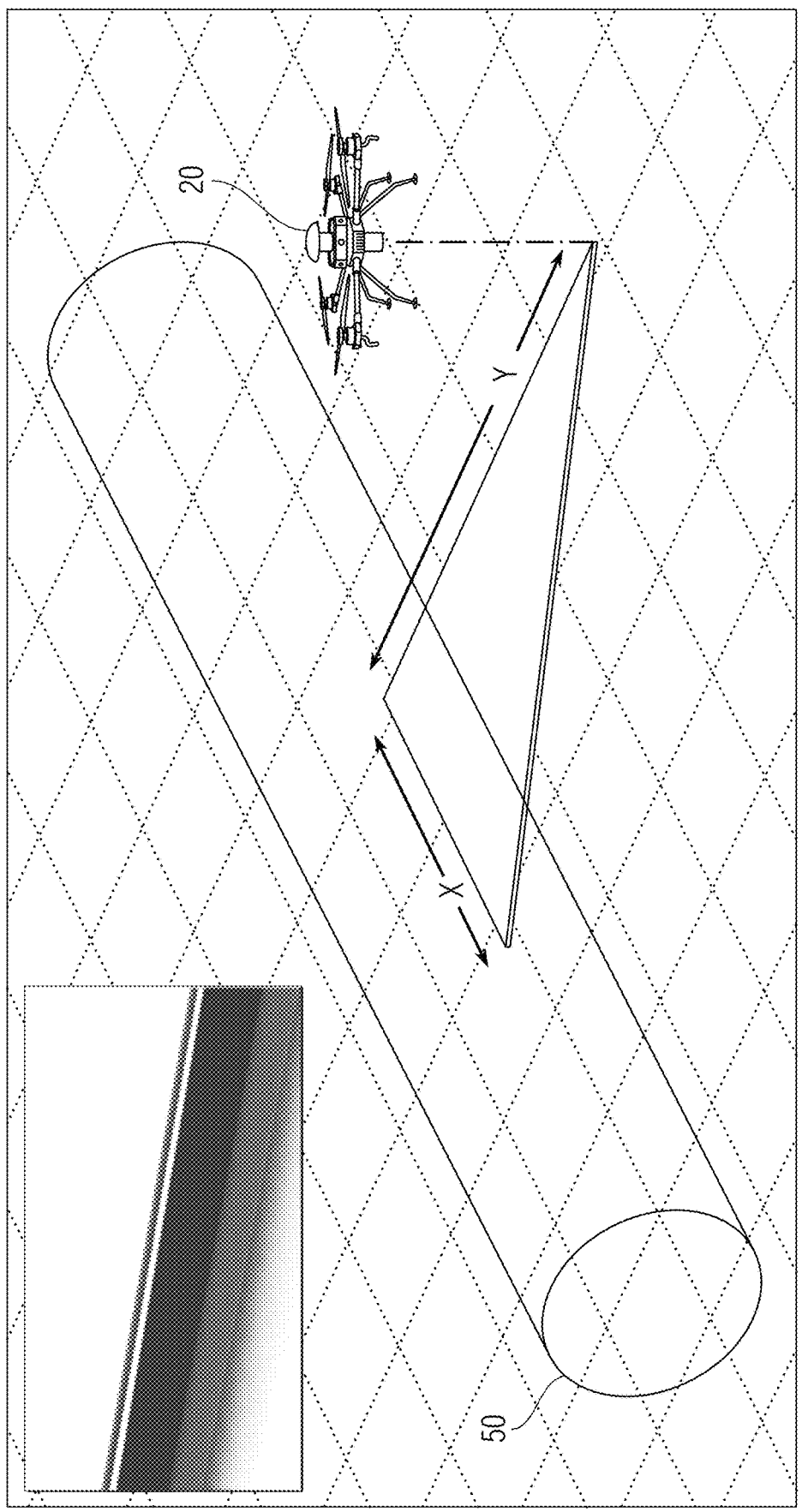
FIG. 16 shows an example of the P-drone equipped with a 2D LiDAR sensor using the output sensor data to calculate a distance (y), an elevation (z) and a bearing (x) with respect to the P-drone in relation to the target asset.

FIG. 16 show a non-limiting example, of the P-drone 20 using 2D LiDAR sensor data to determine distance (y), elevation (z) and bearing (x). The distance (y) is the shortest horizontal distance between the P-drone 20 and the pipe's longitudinal axis (center); the elevation (z) is the elevation with respect to the pipe, which is the vertical distance between the x-y plane of the pipe passing through its center and the P-drone 20; and, the bearing (x) is the bearing deviation or deviation or pan angle between the P-drone 20 and the pipe 50. Regarding the bearing (x), the angle is 0 (zero) when the P-drone 20 is looking exactly perpendicular towards the pipe 50, and increases as the yaw angle increases. As seen in FIG. 16, a distance value can be used instead of the angle.

In this embodiment, the actual diameter of the pipe 50 can be included in data associated with the received images (Step 405), or it can be measured by a 2D LiDAR sensor, or it can be entered manually by an operator at (Step 415). The values for distance (y), elevation (z) and bearing (x) can be estimated, for example, by traditional computer vision algorithms that require knowing the intrinsic values of the camera and its parameters as well as doing edge, contour detection or other methods to find the apparent size of the pipe, or by the machine learning techniques performed by the deep learning model in the situational status determiner 290C. In the latter regard, the deep learning model can be trained using datasets of images taken for pipes from different angles and distances.

For instance, the training dataset (discussed above) can be built and annotated with distance (x), elevation (y), and bearing (z) labels. The images should be also taken at different distances, elevation, bearing, and backgrounds. In an embodiment of the situation status determiner 290C, the CNN can be trained to take in the image as an input and generate an estimation of the distance (x), elevation (y), and bearing (z) as outputs.

The FOV can continue to be analyzed and monitored as the FOV continues along its trajectory to the destination (Step 435). If the analysis determines that the target asset (or a portion of the asset) has appeared in the FOV (YES, Step 440), then the target asset can be tracked (Step 445), otherwise the FOV can continue to be analyzed and monitored (NO at Step 440). The tracking can be performed by the situational status determiner 290C (shown in FIG. 5), which can include a tracking methodology such as, for example, optical flow, correlation filters, or Siamese-like deep learning models.

During target tracking (Step 445), the target asset (and surrounding landmarks) can be analyzed and tracked between image frames, continuously monitoring the target asset and its location in the FOV from one image frame to the next. In this regard, the situational status determiner 290C can determine the 2D center (x, y) position of the target asset (for example, center position of PIPE #01, shown in FIG. 12).

One reason that target tracking (Step 445) may be desirable to use after initial target detection (Step 440) is that tracking algorithms can be much faster, more reliable and more precise than object detection alone. For instance, object detection can be used to find the position of the target asset in the environment at the start of the mission, and target tracking can be used to determine the precise location of the target asset, as well as the precise landing location on the target asset.

While tracking the target asset, a determination can be whether the tracked object is of the same class and type as the target asset (Step 450). For instance, in the case of the PIPE #01 (shown in FIG. 12), the tracked object in the FOV can be analyzed to verify that it has a cylindrical shape. This can be done by the situational status determiner 290C, for example, by using generated 3D point cloud data of the tracked object obtained from the onboard depth camera in the EAS device suite 260. Using 3D point cloud processing such as filtering, and segmentation techniques, such as, for example, RANSAC and Hough transform, the situational status determiner 290C can verify whether the tracked object is a pipe or not. The situational status determiner 290C can determine a confidence score based on the image analysis and, if the confidence score has a value below a predetermined threshold value (for example, less than 50%), it can determine that the tracked object is not the target asset (NO(1) at STEP 450), in which case the P-drone 20 can be caused to maneuver to a different location such as, for example, a location where recognizable landmarks or the target asset might appear in the FOV (Step 435), otherwise (NO(2) at Step 450) the P-drone 20 can be maneuvered with respect to the object in the FOV and the image analyzed to verify whether the tracked object is a pipe or not, adjusting the earlier confidence score up or down depending on the result of the analysis.

Once the tracked object is determined to have the same class and type as the target asset, and predicted to be the target asset (YES at Step 450), then the object can be confirmed and localized as the target asset (Step 455). In localizing the target asset (Step 455), the situational status determiner 290C can determine the location, position and orientation of the target asset, as well as the real-time location, position, and orientation of the P-drone 20 with respect to the target asset and the surrounding environment, including any landmarks in the vicinity.

In the example seen in FIG. 12, the situational status determiner 290C can determine the 3D position of the PIPE #01 by fusing the 2D center (x, y) position of the pipe with a depth (d) value received from the onboard depth camera in the EAS device suite 260 to determine the 3D position of the pipe, including the 3D centroid of the PIPE #01. For example, once the tracked object is confirmed to be a pipe, the centroid of pipe can be measured using the processed 3D point cloud data (PCD). For instance, the situational status determiner 290C, using, for example, RANSAC, can segment the PCD to find the best cylinder in a cropped tracked image. The output of RANSAC can provide a mathematical representation of the best cylinder found that describes its position (in this example, the centroid location on its axis) and its axis orientation with respect to the P-drone 20.

In an embodiment, the situational status determiner 290C can be arranged to interpolate the entire cylinder and then find the corresponding centroid.

It is noted that getting an accurate position of the P-drone 20 within the environment will result in accurate measurements of the 3D centroid of the target asset, since the 3D centroid measurements are taken with respect to the P-drone 20.

In an embodiment where the operation mode for the localization suite 200 is set to the RGBD camera with location sensing mode (operation mode 2), the situational status determiner 290C can be arranged to receive and analyze sensor data, in addition to color image data output from the RGBD camera, which can originate from, for example, the IMU or GPS receiver in the EAS device suite 260 and (in Step 455) obtain a more stable and accurate 3D position of the target pipe, as well as the position of the P-drone 20 with respect to the pipe and surrounding environment. For example, the situational status determiner 290C can apply Kalman practical filters, or similar methods, and process the IMU data with the GPS data to provide a better estimation for the P-drone 20 position.

In an embodiment where the operation mode for the localization suite 200 is set to the RGBD camera with SLAM mode (operation mode 3), the situational status determiner 290C can include, for example Kalman filters and particle filters, which are commonly referred to as Monte Carlo methods. In this regard, the situational status determiner 290C can analyze the color image data and 3D point cloud data (in Step 455) and provide an estimation of the posterior probability function for the position of the P-drone 20 and for the parameters of the map. The situational status determiner 290C can implement methods that can conservatively approximate the model using Covariance intersection, thereby avoiding reliance on statistical independence assumptions to reduce algorithmic complexity.

The situational status determiner 290C can input sensor data from one or more of several different types of sensors in the EAS device suite 260 to the SLAM algorithms, including, for example, single beam optical sensors, 2D (sweeping) laser rangefinders, 3D High Definition LiDAR, 3D Flash LiDAR sensor, and 2D or 3D sonar sensors. In this regard, LiDAR sensors can provide laser scan data, or the camera image data can provide details of many points within an area, and the SLAM algorithms can easily and unambiguously align shapes in these point clouds at each step via image registration.

Figure 14:
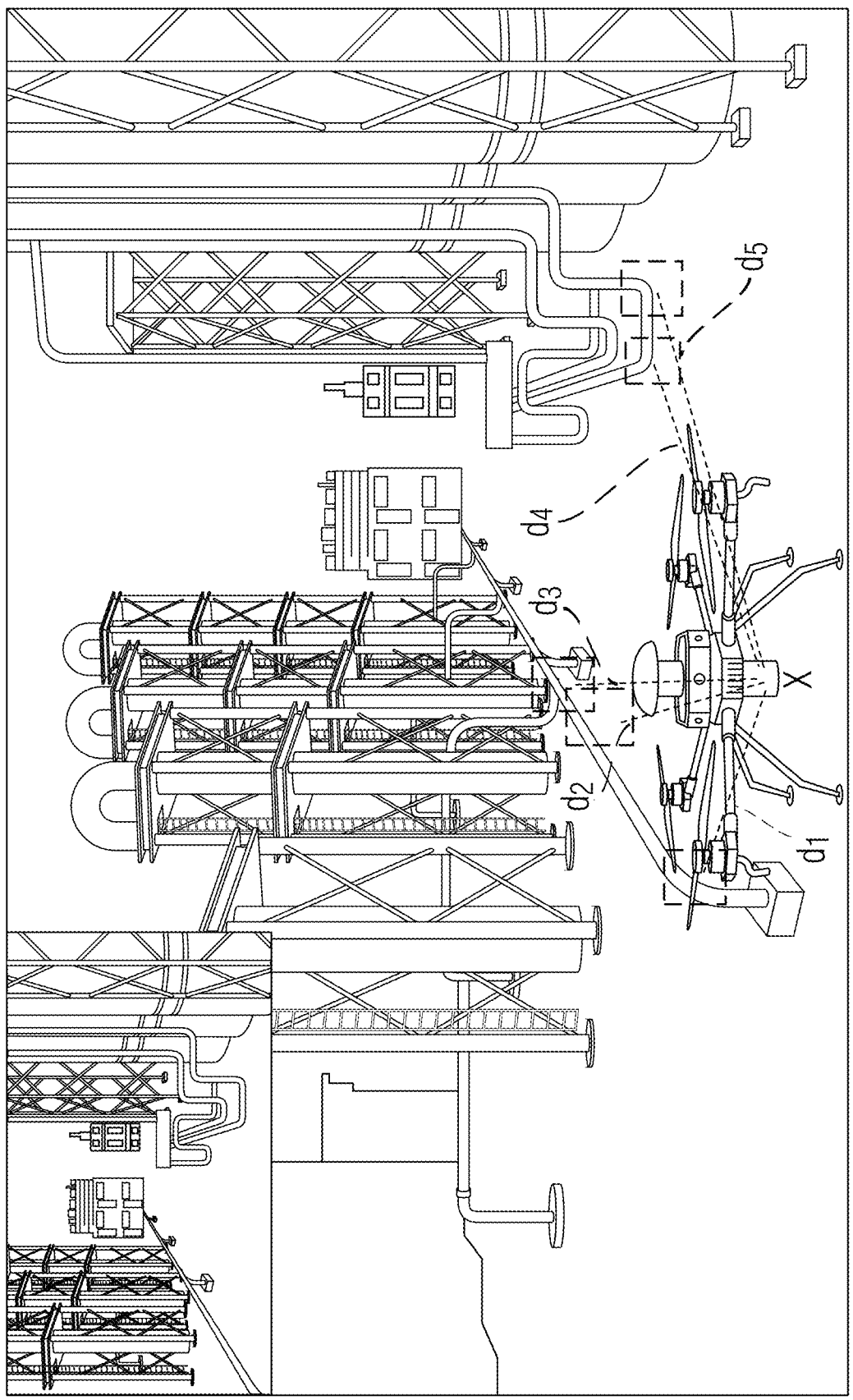
FIG. 14 shows an example of the P-drone in an asset environment, in which the P-drone is arranged to determine distances to various landmarks surrounding a target asset.

In operation mode 3, the SLAM, which can include Graph-SLAM, can improve localization of the P-drone 20. For instance, the landmarks detected in Step 435 can be used as references or constraints when determining localization. The landmarks can be analyzed and recognized by the situational status determiner 290C to accurately identify specific points on the target asset, including the landing location on the asset. For instance, referring to FIG. 14, which shows an example of the P-drone 20 in an environment, the situational status determiner 290C can analyze the image data for the FOV 437, recognize each of the landmarks in the FOV 437 and determine the situational status (including localization) for the P-drone 20, including a landing location on the target asset. The situational status determiner 290C can be arranged to calculate the distance from the P-drone 20 to each landmark object, including, for example, distances $d_1$-$d_5$.

Once the asset is localized (Step 455), which in the case of the PIPE #01 means the centroid and orientation of the pipe are determined, the P-drone 20 can be navigated to the target asset using trajectory planning generated by the trajectory path determiner 290B and, upon reaching the landing location on the target asset, the P-drone 20 can be controlled by the landing unit 290E to land at the location (Step 460). For example, the trajectory path determiner 290B can calculate cubic or higher order polynomial trajectories to generate a trajectory path from the current location of the P-drone 20 to the landing site on the target asset. To fully generate the trajectory, the trajectory path determiner 290B can use heuristic rules to define intermediate velocities and acceleration for the P-drone 20. Once the P-drone 20 is within close proximity to the target asset, the trajectory path determiner 290B can be regarded as having essentially achieved its goal.

The landing unit 290E can interact with the situational status determiner 290C and determine at least three degrees of freedom (DOF) of the P-drone 20 with respect to the landing surface on the target asset, including, for example pitch, yaw and roll. The landing unit 290E can then interact with the flight controller 280 and motor driver suite 270 to position the support members 120 (shown in FIGS. 2 and 3) for optimal landing and land the P-drone 20 at the landing location (Step 460).

Upon completing landing and being properly seated on or attached to the landing surface (Step 460), the crawler 130 (shown in FIG. 3) can be released to perform the inspection or maintenance job and return to the P-drone 20 (Step 465). The crawler 130 can then be docked in or grasped by the P-drone 20 and the P-drone 20 permitted to return to its home location. The home location can include the original location from which the P-drone 20 launched for the mission, or another preset geographic location.

In an embodiment, the P-drone is arranged to autonomously launch, fly and perch on a curved surface from a starting position located remotely away from the curved surface. The P-drone comprise a three-dimensional (3D) depth camera configured to capture and output color image data and 3D point clouds of a part of the environment within the camera's FOV. The P-drone can include a 2D LiDAR sensor or system configured to capture and output 2D slices of the environment. The P-drone includes a localization suite that is configured to control the depth camera and the LiDAR sensor to capture the color images, 3D point clouds and the 2D slices and autonomously detect and localize the curved surface using the color image data and captured 3D point clouds, and the captured 2D slices, and autonomously direct the P-drone from the starting position to a landing position on the curved surface based on the autonomous detection and localization of the curved surface.

In an embodiment, the localization system is configured to use the captured image data and 3D point clouds to perform autonomous detection and localization from the starting position while autonomously directing the P-drone to the landing position until the P-drone reaches a proximity of the curved surface; and switch from using the image data and 3D point clouds to using the captured 2D slices to perform the autonomous detection and localization once the P-drone reaches the proximity of the curved surface.

In an embodiment, the localization suite is configured to autonomously direct the P-done to an alignment position within the proximity of the curved surface prior to the landing, the alignment position being where the P-drone is aligned with respect to the landing position. Once aligned, the localization system is configured to use the captured 2D slices to autonomously direct the UAV to move directly from the alignment position to the landing position.

In an embodiment, the localization system is configured to autonomously detect and localize the curved surface by fusing the 3D point clouds and the 2D slices with outputs from a CCN that has analyzed the color image data and identified objects in the FOV. The fusing can include using the captured 3D point clouds to perform a first pass of the autonomous detection and localization of the curved surface, and, capturing a corresponding one of the 2D slices using the detected and localized curved surface from the first pass. Then, using the corresponding one of the 2D slices, a second pass can be performed of the autonomous detection and localization of the curved surface.

In an embodiment, the localization system includes an IMU device configured to estimate the pose of the depth camera, wherein the localization system is configured to use the estimated pose of the depth camera between capturing a first one of the 3D point clouds and capturing a second one of the 3D point clouds in order to predict the location of the curved surface in the second one of the 3D point clouds from the detected and localized curved surface in the first one of the 3D point clouds.

In an embodiment, the localization system is configured to use the captured 3D point clouds to autonomously detect and localize the curved surface and control the LiDAR sensor to capture the 2D slices normal to the detected and localized curved surface.

In an embodiment, the curved surface is cylindrical and the localization system is configured to control the LiDAR sensor to capture the 2D slices normal to the central axis of the cylinder.

In an embodiment, the localization system includes the localization suite 290, which can include a random sample consensus (RANSAC) approach to autonomously detect and localize the curved surface.

In an embodiment, the localization suite 290 is configured use the captured 3D point clouds or the captured 2D slices or both the captured 3D point clouds and the captured 2D slices to detect one or more obstacles on a flight path of the P-drone from the starting position to the landing position, and autonomously redirect the P-drone to avoid the one or more obstacles on the flight path.

In an embodiment, the localization suite 290 is configured to detect ellipse-like shapes using RANSAC and Hough transform. While fitting a circle to the 2D LiDAR sensor output, a pipe can be detectable in a 2D LiDAR scan. In this regard, the localization suite 290 might assume that the scan slice is perpendicular to the target pipe's longitudinal axis. In general, this might be the case where the target pipe's longitudinal axis has been located, and the 2D LiDAR scan adjusted accordingly. Otherwise, the 2D LiDAR slice might fit an ellipse instead. Put another way, if the P-drone is pointing directly towards the pipe and is perpendicular to it, the pipe will look like a segment of a circle in the 2D LiDAR scan. However, if the P-drone turns (yaws) right or left by a slight angle $\theta$, then the pipe will no longer show up as a perfect circle segment but rather as a segment of an ellipse. The eccentricity of the ellipse is directly related to the yaw/azimuth angle $\theta$ of the P-drone with respect to the pipe.

More formally, the minor axis length of the ellipse can be equal to the pipe diameter D when the P-drone is level and pitching. Non-zero pitch angles can be compensated for by measuring the angle through the onboard IMU and rotating the LiDAR data points by that angle. The relationship between the P-drone yaw angle $\theta$ and the major axis length L can be characterized as follows: $\theta = \arccos(D/L)$. Therefore, in an embodiment, the localization suite 290 is programmed to fit an ellipse to the 2D LiDAR data using the pipe points in the LiDAR data, and then extract the corresponding major and minor axis lengths to identify the pipe diameter and the P-drone's yaw angle.

In another embodiment, the localization suite 290 is configured to use a Hough transform to make the 2D LiDAR data less sensitive to noise when using RANSAC to find the best ellipse. Care should be taken, however, to prevent the large search space dimensionality from dominating the computation time and leading to unacceptable performance.

A variety of localization techniques using a 3D depth camera are discussed throughout. A depth camera is a good candidate to detect and localize a objects such as straight pipes in a 3D point cloud generated by the depth camera. The point cloud is a discrete volumetric representation of objects in 3D space. Although images provide a rich source of features of the captured scene, it can be challenging to localize and estimate the 3D pose of objects using monocular cameras. One of the main challenge comes from depth estimation. Stereo cameras can provide some relief at the expense of more computations and with limited ranges. 3D LiDAR systems provide a volumetric representation of the sensed environment, which makes object localization easier and more accurate. However, existing 3D LiDAR sensor devices may not be feasible to use for certain applications such as aerial applications where a small UAV is to be used, due to the 3D LiDAR's relatively heavy weight.

Depth cameras thus provide a low-cost tradeoff solution between stereo cameras and 3D LiDAR systems. Depth cameras, often called RGBD (or RGB0-D) cameras, combine a regular RGB camera and IR sensors to provide RGB images as well as the estimated depth for each pixel. The depth image can be converted to a point cloud, which provides a volumetric representation of the sensed environment. 3D LiDAR sensor devices can generally provide more accurate point clouds compared to depth cameras. However, with some filtering techniques, which are discussed above, point clouds generated by depth cameras can be adequate for autonomous perching as discussed herein. Nowadays, there are several low-cost depth cameras that are small enough to be mounted on small UAV's, such s, for example, the Intel RealSense D435 camera.

In an embodiment, the localization suite 290 can be configured to perform object segmentation of cylindrical objects after the input point cloud is filtered. There are many ways to do object segmentation in a point cloud including, for example, region growing, min-cut graph, difference of normal, Euclidean distance-based clustering, and model fitting using RANSAC. RANSAC is an iterative method to estimate parameters of a mathematical model from a set of observed data that contains undesirable outliers. Therefore, RANSAC also can be described as an outlier detection method. This method is practically useful because real field data contains measurements of other structures surrounding the target object in addition to other measurement noises that are considered outliers.

In general, a pipe can be represented by a cylinder model that can be parametrized by three model parameters, namely a radius of the cylinder, a point (three coordinates) on the central axis of the cylinder, and an orientation or 3D rotation (three angles) of the central axis with respect to an origin. The main mechanism of the RANSAC algorithm is discussed as follows. A model of the object is defined. In this case, a cylinder model with the aforementioned parameters (radius, central axis point, orientation of central axis). A distance function is defined to measure how far a point is from a fitted model. In an embodiment, Euclidian distance serves as the distance function.

In some embodiments, the open project Point Cloud Library (PCL) can be used to provide several functionalities for point cloud filtering including an implementation of cylinder segmentation using RANSAC. In one such embodiment, PCL can be used to perform point cloud filtering and cylinder segmentation. hile point cloud filtering and pipe segmentation using RANSAC work well most of the time to detect and localize the target pipe, at times they can fail, such as when the input data has enough noise that a spurious noisy segment appears to be the best segment, or when there are two cylinders in the input data, and the technique identifies the wrong one. Accordingly, in some embodiments, to reduce the falsely detected pipes and to reduce the ambiguity of detection in the presence of other pipes, pipe tracking mechanisms are included.

In an embodiment, the localization suite is configured to receive or determine the location and orientation of the depth camera (or P-drone), and from this and the initial pipe location (using RANSAC), determine the initial location of the pipe. Once the initial location of the pipe is known, the localization suite can use IMU sensor measurements and fuse them with the last estimate of the pipe location to predict the next location of the pipe in the depth camera's FOV. Here, the localization system can be configured to perform the fusion of the IMU measurements and previous pipe location estimate in a Kalman filter framework. In a Kalman filter framework, there are two steps, a prediction step followed by an update step. The IMU measurements can be used in the prediction step to predict the pose of the IMU (or of the depth camera that is attached to it) in space. The prediction can be done with acceptable accuracy over a short time period before it starts to diverge.

The localization suite 290 can be configured to get depth measurements around the predicted location, estimating the pipe location from these depth measurements, and then updating the pipe location estimate. Here, the localization suite can be configured to update the location estimate of the pipe by using a subset of the input point cloud for the next frame that is around the predicted location to find and localize the pipe in the next frame. The estimated pipe location in this subset point cloud can be then used to correct the predicted location and to avoid divergence. The localization suite 290 can be arranged to proceed iteratively repeating prediction and correction to better track the pipe using sensor fusion to account for movement of the depth camera during the flight of the P-drone.

In an embodiment, the P-drone can include the UAV described in U.S. Patent Application Publication No. US 2020/0174129, titled "Automation Methods for UAV Perching on Pipes," published Jun. 4, 2020, the entirety of which is incorporated herein by reference as if fully set forth here.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An autonomous aerial vehicle for launching, flying, and landing on a cylindrically curved surface in an environment from a remote starting location without human intervention, the autonomous aerial vehicle comprising:

an environment awareness sensor device suite having a three-dimensional (3D) depth camera arranged to capture and output real-time image data and 3D point cloud data of a field of view (FOV);

an asset targeting unit arranged to select an asset in the environment as a destination location for a landing from one or more images corresponding to assets in the environment;

a trajectory path determiner arranged to calculate a trajectory path to the selected destination location from a current location of the autonomous aerial vehicle;

a flight controller arranged to launch and fly the autonomous aerial vehicle from the remote starting location to the selected destination location according to the calculated trajectory path;

a situational status determiner arranged to, in real-time and without human intervention,
  receive the captured real-time image data and 3D point cloud data of the FOV outputted from the 3D depth camera of the environmental awareness sensor device suite,
  analyze the received real-time image data and 3D point cloud data,
  detect all objects in the FOV from the analyzed real-time image data,
  classify each detected object in the FOV as a cylindrical object or a landmark object,
  determine a confidence score for each detected object classified as a cylindrical object,
  predict a detected object classified as a cylindrical object in the FOV is the selected asset based on the determined confidence score,
  predict a location of the predicted object with respect to the autonomous aerial vehicle based on the analyzed 3D point cloud data for the predicted object in the FOV,
  determine, based on the determined confidence score, the predicted object is the selected asset; and
  interact with the trajectory path determiner such that the flight controller guides the launched and flying autonomous aerial vehicle towards the predicted location of the predicted object determined to be the selected asset; and a landing unit arranged to interact with a motor driver suite to land the guided autonomous aerial vehicle on a cylindrically curved surface of the selected asset.

2. The autonomous aerial vehicle in claim 1, wherein the asset is selected by the asset targeting unit based on an operator selection.

3. The autonomous aerial vehicle in claim 1, wherein the selected asset comprises a pipe, a vessel, or a tank.

4. The autonomous aerial vehicle in claim 3, wherein the selected destination location includes a location on a top surface of the selected asset, a bottom surface of the selected asset, a front surface of the selected asset, or a back surface of the selected asset.

5. The autonomous aerial vehicle in claim 1, wherein the situational status determiner comprises a deep learning neural network trained for said environment using a training dataset comprising at least one annotated image for each asset in the environment, the at least one annotated image including the asset and any surrounding landmark objects.

6. The autonomous aerial vehicle in claim 1, wherein the situational status determiner is further arranged to recognize each detected object classified as a landmark object and predict a location of the recognized object with respect to the autonomous aerial vehicle as it moves in the environment, wherein the landmark object includes an elbow, a tee, a valve, or a flange.

7. The autonomous aerial vehicle in claim 5, wherein the deep learning neural network is arranged to:
  detect each landmark object in the FOV;
  predict a location of each detected landmark object with respect to the autonomous aerial vehicle; and
  predict a location of the autonomous aerial vehicle with respect to the environment based on the predicted location of each detected landmark object.

8. The autonomous aerial vehicle in claim 5, wherein the training dataset comprises augmented images, including images created by a data augmentation technique.

9. The autonomous aerial vehicle in claim 8, wherein the data augmentation technique comprises object rotation, object translation, or cropping of images.

10. The autonomous aerial vehicle in claim 6, wherein the environment awareness sensor device suite comprises one or more cameras, in addition to the three-dimensional (3D) depth camera, each arranged to track nearby landmark objects while the autonomous aerial vehicle is landing on the asset.

11. A computer-implemented method for launching, flying, and landing an autonomous aerial vehicle on a cylindrically curved surface in an environment from a remote starting location without human intervention, the method comprising:
  selecting an asset in the environment as a destination for the autonomous aerial vehicle from one or more images corresponding to assets in the environment;
  calculating, by a deep learning model, a trajectory path to the selected destination from a current location of the autonomous aerial vehicle;
  launching and flying the autonomous aerial vehicle from the remote starting location to the selected destination along the calculated trajectory path;
  capturing in real-time, by a depth camera, an image and a corresponding three-dimensional point cloud of a field of view (FOV);
  analyzing in real-time, by the deep learning model, the captured image and corresponding three-dimensional point cloud of the FOV;
  detecting in real-time, by the deep learning model, all objects in the FOV from the analyzed image;
  classifying in real-time, by the deep learning model, each detected object in the FOV as a cylindrical object or a landmark object;
  determining in real-time, by the deep learning model, a confidence score for each detected object classified as a cylindrical object;
  predicting in real-time, by the deep learning model, a detected object classified as a cylindrical object in the FOV is the selected asset based on the determined confidence score;
  predicting in real time, by the deep learning model, a location of the predicted object with respect to the autonomous aerial vehicle based on the analyzed three-dimensional point cloud for the predicted object in the FOV;
  determining in real-time, by the deep learning model, the predicted object is the selected asset based on the determined confidence score; and
  landing the autonomous aerial vehicle on a cylindrically curved surface of the selected asset.

12. The computer-implemented method in claim 11, further comprising:
  verifying, by the deep learning model, the predicted object is the selected asset.

13. The computer-implemented method in claim 12, wherein the verifying, by the deep learning model, comprises:
  tracking the predicted object between successive images and corresponding three-dimensional point clouds of the FOV from the depth camera.

14. The computer-implemented method in claim 13, wherein the tracking the predicted object between successive images comprises:
  receiving sensor data of the FOV from a LiDAR sensor; and
  fusing, by the deep learning model, the received sensor data of the FOV from the LiDAR sensor with one or more of the corresponding three-dimensional point clouds to determine a location of the tracked object with respect to the autonomous aerial vehicle.

15. The computer-implemented method in claim 11, wherein predicting the location of the predicted object with respect to the autonomous aerial vehicle comprises:
  recognizing, by the deep learning model, each detected object classified as a landmark object in the FOV;
  predicting, by the deep learning model, a location of each recognized object classified as a landmark object in the FOV with respect to the autonomous aerial vehicle; and
  predicting, by the deep learning model, a location of the selected asset with respect to the autonomous aerial vehicle based on the predicted location of each recognized object classified as a landmark object in the FOV.

16. The computer-implemented method in claim 11, wherein the asset is selected in response to an operator entry or selection.

17. The computer-implemented method in claim 11, wherein selecting the asset in the environment as a destination for the autonomous aerial vehicle includes:
  setting a landing location on the selected asset to land the autonomous aerial vehicle.

18. The computer-implemented method in claim 11, wherein the deep learning model is trained for said environment using a training dataset comprising at least one annotated image for each asset in the environment, the at least one annotated image including the asset and any nearby landmark objects.

19. The computer-implemented method in claim 11, wherein the deep learning model is arranged to recognize each detected object classified as a landmark object and predict a location of the recognized object with respect to the autonomous aerial vehicle as the autonomous aerial vehicle moves in the environment.

20. The computer-implemented method in claim 11, wherein the deep learning model is trained to:
   detect each landmark object in the FOV;
   predict a location of each detected landmark object with respect to the autonomous aerial vehicle; and
   adjust the predicted location of the selected asset in relation to the autonomous aerial vehicle based on the predicted location of each landmark object.

21. The computer-implemented method in claim 11, further comprising:
   receiving, by the deep learning model, image data from one or more cameras, in addition to the three-dimensional (3D) depth camera; and
   tracking, by the deep learning model, nearby landmark objects based on the received image data while the autonomous aerial vehicle is landing on the selected asset.

22. A non-transitory computer readable storage medium containing launching, flying and landing computer program instructions that, when executed on a processor in an autonomous aerial vehicle, cause the processor to control the autonomous aerial vehicle by:
   selecting an asset in an environment as a destination for the autonomous aerial vehicle from one or more images corresponding to assets in the environment;
   calculating, by a deep learning model, a trajectory path to the selected destination from a current location of the autonomous aerial vehicle;
   launching and flying the autonomous aerial vehicle from a remote starting location to the selected destination along the calculated trajectory path;
   capturing in real-time, by a depth camera, an image and a corresponding three-dimensional point cloud of a FOV;
   analyzing in real-time, by the deep learning model, the captured image and corresponding three-dimensional point cloud of the FOV;
   detecting in real-time, by the deep learning model, all objects in the FOV from the analyzed image;
   classifying in real-time, by the deep learning model, each detected object in the FOV as a cylindrical object or a landmark object;
   determining in real-time, by the deep learning model, a confidence score for each detected object classified as a cylindrical object;
   predicting in real-time, by the deep learning model, a detected object classified as a cylindrical object in the FOV is the selected asset based on the determined confidence score;
   predicting in real-time, by the deep learning model, a location of the predicted object with respect to the autonomous aerial vehicle based on the analyzed three-dimensional point cloud for the predicted object in the FOV;
   determining in real-time, by the deep learning model, the predicted object is the selected asset based on the determined confidence score; and
   landing the autonomous aerial vehicle on a cylindrically curved surface of the selected asset.

* * * * *